US011677730B2

(12) United States Patent
Chen et al.

(10) Patent No.: US 11,677,730 B2
(45) Date of Patent: Jun. 13, 2023

(54) DEVICE AUTHENTICATION

(71) Applicant: Intel Corporation, Santa Clara, CA (US)

(72) Inventors: Yu-Yuan Chen, Chandler, AZ (US); Wojciech S. Powiertowski, Beaverton, OR (US); Srikanth Varadarajan, Hillsboro, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1139 days.

(21) Appl. No.: 16/024,469

(22) Filed: Jun. 29, 2018

(65) Prior Publication Data

US 2019/0052617 A1     Feb. 14, 2019

Related U.S. Application Data

(60) Provisional application No. 62/621,153, filed on Jan. 24, 2018.

(51) Int. Cl.
*H04L 9/40*     (2022.01)
*G06F 13/42*     (2006.01)
(Continued)

(52) U.S. Cl.
CPC .......... *H04L 63/08* (2013.01); *G06F 13/4282* (2013.01); *G06F 21/44* (2013.01);
(Continued)

(58) Field of Classification Search
CPC ....... H04L 63/08; H04L 9/088; H04L 9/3234; H04L 9/3239; H04L 9/3265;
(Continued)

(56) References Cited

U.S. PATENT DOCUMENTS 8,543,838 B1 *    9/2013    Au ........................ G06F 21/602
                                                 713/190
8,978,146 B2      3/2015    Paksoy et al.
(Continued)

OTHER PUBLICATIONS

EPO; Office Action issued in European Patent Application No. EP 18213787.7, dated Sep. 2, 2020; 5 pages.
(Continued)

*Primary Examiner* — Idriss N Alrobaye
*Assistant Examiner* — Henry W Yu
(74) *Attorney, Agent, or Firm* — Alliance IP, LLC

(57) ABSTRACT

A device includes a microcontroller, memory including secure memory to store a private key, a set of registers, and an authentication engine. The set of registers includes a write mailbox register and a read mailbox register, and message data is to be written to the write mailbox register by a host system. The message data includes at least a portion of a challenge request, and the challenge request includes a challenge by the host system to authenticity of the device. The authentication engine generates a response to the challenge, where the response includes data to identify attributes of the device and a signature generated using the private key. The authentication engine causes at least a portion of the response to be written to the read mailbox register to be read by the host system.

24 Claims, 25 Drawing Sheets

(51) Int. Cl.
| | |
|---|---|
| *G06F 21/44* | (2013.01) |
| *G06F 21/73* | (2013.01) |
| *G06F 21/85* | (2013.01) |
| *H04L 9/08* | (2006.01) |
| *H04L 9/32* | (2006.01) |
| *G06F 13/16* | (2006.01) |
| *G06F 15/167* | (2006.01) |
| *H04L 9/00* | (2022.01) |

(52) U.S. Cl.
CPC .............. *G06F 21/73* (2013.01); *G06F 21/85* (2013.01); *H04L 9/088* (2013.01); *H04L 9/3234* (2013.01); *H04L 9/3239* (2013.01); *H04L 9/3265* (2013.01); *H04L 9/3271* (2013.01); *H04L 63/0823* (2013.01); *H04L 63/0876* (2013.01); *G06F 2213/0026* (2013.01); *G06F 2213/0042* (2013.01); *G06F 2221/2103* (2013.01); *H04L 9/50* (2022.05)

(58) Field of Classification Search
CPC .............. H04L 9/3271; H04L 63/0823; H04L 63/0876; H04L 2209/38; G06F 13/4282; G06F 21/44; G06F 21/73; G06F 21/85; G06F 2213/0026; G06F 2213/0042; G06F 2221/2103; G06F 13/1668; G06F 13/4221; G06F 15/167
USPC ............................. 726/5, 18, 27; 710/15, 36
See application file for complete search history.

(56) References Cited

U.S. PATENT DOCUMENTS

| | | | | |
|---|---|---|---|---|
| 9,245,106 | B2* | 1/2016 | Smith ..................... | G06F 21/85 |
| 2007/0005965 | A1* | 1/2007 | Nalliah ............... | H04L 63/0823 |
| | | | | 713/168 |
| 2013/0305053 | A1* | 11/2013 | Laffey .................. | H04L 9/3247 |
| | | | | 713/176 |
| 2016/0094531 | A1* | 3/2016 | Unnikrishnan ......... | H04L 63/08 |
| | | | | 726/7 |
| 2017/0201380 | A1 | 7/2017 | Schaap et al. | |
| 2017/0235957 | A1 | 8/2017 | Maletsky | |
| 2017/0373843 | A1* | 12/2017 | Benson .................. | H04L 9/006 |
| 2018/0183581 | A1 | 6/2018 | Elbaz et al. | |
| 2019/0220601 | A1 | 7/2019 | Sood et al. | |
| 2019/0220617 | A1 | 7/2019 | Harriman et al. | |
| 2019/0281025 | A1 | 9/2019 | Harriman et al. | |

OTHER PUBLICATIONS

"Correct PD Responder Unchunked Timing for tSinkTx, Revision 1.0", USB Type-C Authentication Engineering Change Notice Form, accessed at: https://www.usb.org/document-library/usb-authentication-specification-rev-10-ecn-and-errata-through-july-24-2017 on Jan. 8, 2019, 2 pages.

"Define USB Device Behavior for Default State and Invalid wLength, Revision 1.0", USB Type-C Authentication Engineering Change Notice Form, accessed at: https://www.usb.org/document-library/usb-authentication-specification-rev-10-ecn-and-errata-through-july-24-2017 on Jan. 8, 2019, 3 pages.

EPO; Extended European Search Report issued for EP Patent Application No. 18213787.7, dated Jun. 14, 2019; 8 pages.

USB 3.0 Promoter Group, "Universal Serial Bus Type-C Authentication Specification: Revision 1.0 with ECN and Errata through Jul. 24, 2017", accessed at: https://www.usb.org/document-library/usb-authentication-specification-rev-10-ecn-and-errata-through-july-24-2017 on Jan. 8, 2019, 66 pages.

EPO; Office Action issued in European Patent Application No. EP 18213787.7, dated Jan. 24, 2022; 4 pages.

* cited by examiner

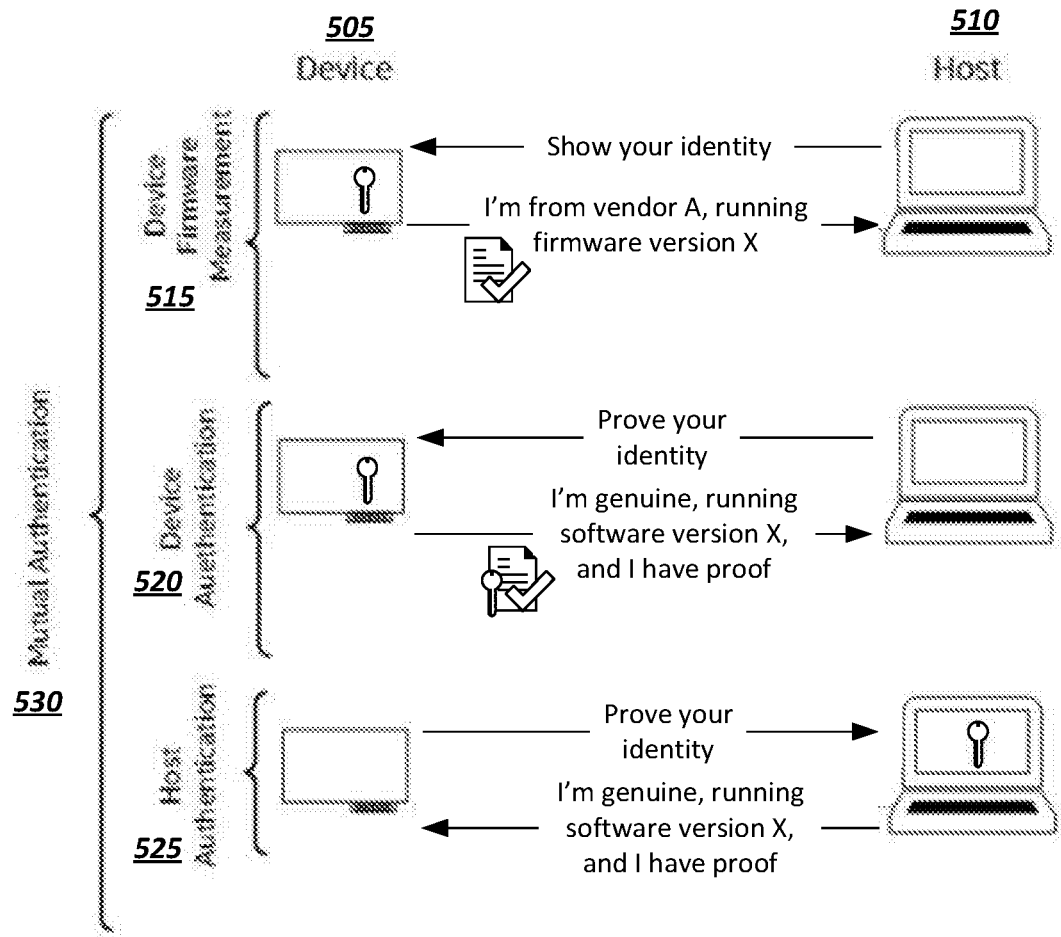
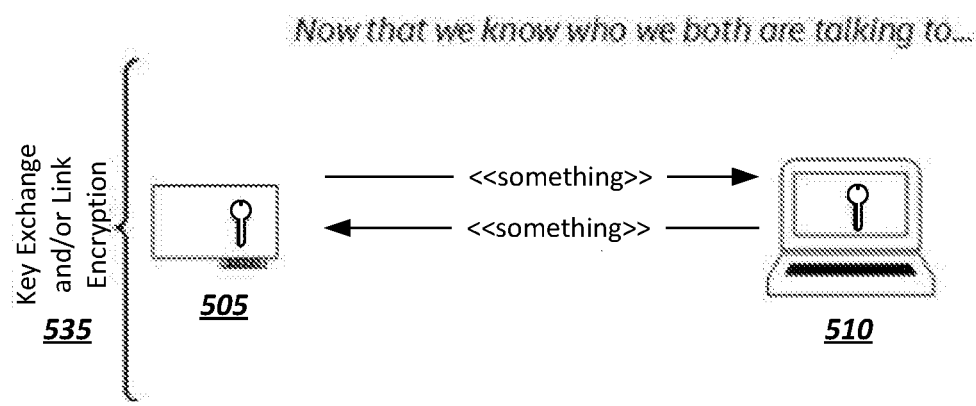
FIG. 5

| | | |
|---|---|---|
| 905 | PCI Express EC Header 1 | 00h |
| 910 | PCI Express EC Header 2 | 04h |
| 915 | PCI Express EC Header 3 | 08h |
| 920 | Authentication Header | 0Ch |
| 930 | Authentication Capabilities 1 | 10h |
| 935 | Authentication Capabilities 2 | 14h |
| 940 | Authentication Capabilities 3 | 18h |
| 945 | Authentication Status | 1Ch |
| 950 | Authentication Control 1 | 20h |
| 955 | Authentication Control 2 | 24h |
| 960 | Authentication Control 3 | 28h |
| 965 | Write Data Mailbox | 2Ch |
| 970 | Read Data Mailbox | 30h |

| 31 | 20 19 | 16 15 | 0 |
|---|---|---|---|
| EC Length | EC Revision | | EC Vendor ID |

910a

| Bit Location | Register Description | Attributes |
|---|---|---|
| 15:0 | Extended Capability Vendor ID— This field is the Vendor ID associated with the vendor that defined the contents of this capability. Must report Intel vendor ID (8086h). Assigned by PCI SIG. | Read Only |
| 19:16 | Extended Capability Revision— This field is a vendor-defined version number that indicates the version of the DVSEC structure. | Read Only |
| 31:20 | Extended Capability Length— This field indicates the number of bytes in the entire Extended Capability structure. | Read Only |

| 31 | 16 15 | 8 7 | 2 | 1 | 0 |
|---|---|---|---|---|---|
| Reserved | Authentication Version | Reserved | | AIS | AS |

920a

| Bit Location | Register Description | Attributes |
|---|---|---|
| 0 | Authentication Support (AS)— This field indicates support for the PCI Express Authentication by the Device. Hardware is permitted to return a value of 0b in this bit to indicate that, although the Extended Capability itself is implemented, the Authentication interface is not available. System firmware/software confirms that this bit is Set before attempting to interpret or use any of the other fields of this Extended Capability. | HwInit |
| 1 | Authentication Interrupt Support (AIS)— When Set, this bit indicates Device support for using MSI/MSI-X to indicate completion of an authentication message by the Device. | Read Only |
| 7:2 | Reserved | Reserved |
| 15:8 | Authentication Version— This field indicates the highest version of Authentication supported by the Device. | Read Only |
| 31:16 | Reserved | Reserved |

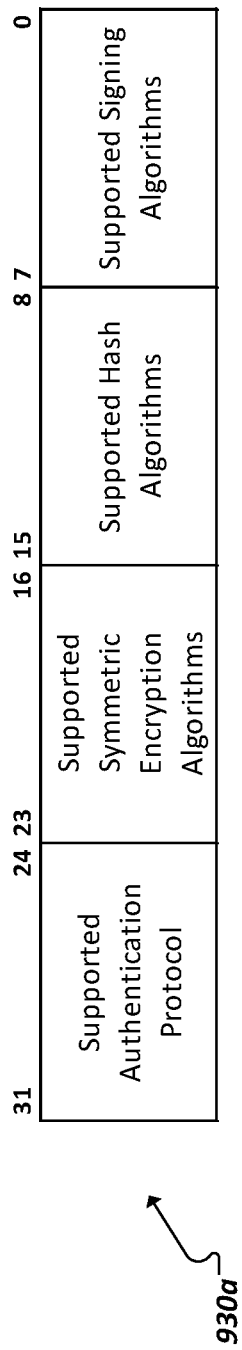

| Bit Location | Register Description | Attributes |
|---|---|---|
| 7:0 | Supported Signing Algorithms—This field indicates the supported signing algorithms by the Device. | Read Only |
| 15:8 | Supported Hash Algorithms—This field indicates the supported hashing algorithms. | Read Only |
| 23:16 | Supported Symmetric Encryption Algorithms—This field indicates the supported symmetric encryption algorithms. | Read Only |
| 31:24 | Supported Authentication Protocols—This field indicates the supported authentication protocols. | Read Only |

FIG. 10E

| 31 | 30 | | 1 | 0 |
|---|---|---|---|---|
| Response Ready | Reserved | | | Busy |

945a

| Bit Location | Register Description | Attributes |
|---|---|---|
| 0 | Busy— When Set, this bit indicates the Device is unable to start an authentication session. | Read Only |
| 30:1 | Reserved | Reserved |
| 31 | Response Ready— When Set, this bit indicates the Device has a valid message to be read by the Host. The Device clears this bit only after the entire message has been consumed. | Read Only |

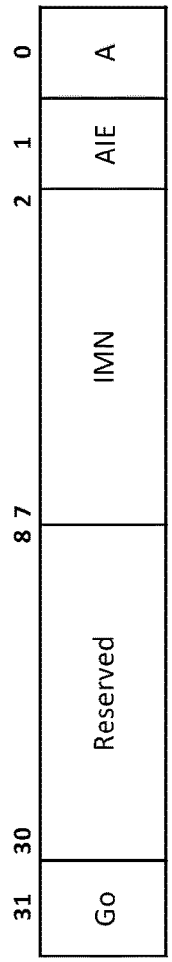

| Bit Location | Register Description | Attributes |
|---|---|---|
| 0 | Abort— When set, the current message sent by the Host is aborted by the Device. The Device asserts the Busy bit in Authentication Status when processing the Abort and clears the Busy bit when the Abort is completed. | Read/Write |
| 1 | Authentication Interrupt Enable (AIE)— When set and MSI/MSI-X is enabled, the Device must issue an MSI/MSI-X interrupt to indicate the 0b to 1b transition of the Response Ready bit. | Read/Write |
| 7:2 | Interrupt Message Number— This field indicates which MSI/MSI-X vector is used for the interrupt message generated in association with Valid. | Read Only |
| 30:8 | Reserved | Reserved |
| 31 | Go— A write of 1b to this bit indicates to the Device that the Device can start consuming the message sent in through the Write Data Mailbox. The Device asserts the Busy bit in Authentication Status when processing the message and clears the Busy bit when the entire message is consumed. | Read/Write |

FIG. 10I

| 31 | 24 23 | 16 15 | 8 7 | 0 |
|---|---|---|---|---|
| | Authentication Protocol Config | Symmetric Encryption Algorithm Config | Hash Algorithm Config | Signing Algorithms Config |

955a

| Bit Location | Register Description | Attributes |
|---|---|---|
| 7:0 | Signing Algorithms Configuration— Indicates the chosen signing algorithm for the authentication session. This field is written before the Go bit in the Authentication Control 1 Register is asserted. Any modification to this field after the Go bit in the Authentication Control 1 Register is asserted results in undefined behavior by the Device. | Read/Write |
| 15:8 | Hash Algorithms Configuration— Indicates the chosen hash algorithm for the authentication session. This field is written before the Go bit in the Authentication Control 1 Register is asserted. Any modification to this field after the Go bit in the Authentication Control 1 Register is asserted results in undefined behavior by the Device. | Read/Write |
| 23:16 | Symmetric Encryption Algorithms Configuration— Indicates the chosen symmetric encryption algorithm for the authentication session. This field is written before the Go bit in the Authentication Control 1 Register is asserted. Any modification to this field after the Go bit in the Authentication Control 1 Register is asserted results in undefined behavior by the Device. | Read/Write |
| 31:24 | Authentication Protocol Configuration— Indicates the chosen authentication protocol for the authentication session. This field is written before the Go bit in the Authentication Control 1 Register is asserted. Any modification to this field after the Go bit in the Authentication Control 1 Register is asserted results in undefined behavior by the Device. | Read/Write |

| Bit Location | Register Description | Attributes |
|---|---|---|
| 31:0 | Write Data Mailbox— The Device received data from consecutive 32-bit data writes to this register. | Read/Write |

| Bit Location | Register Description | Attributes |
|---|---|---|
| 31:0 | Read Data Mailbox— Response Ready is asserted when the FIFO is populated with a complete response message. | Read Only |

| Offset | Field | Size | Value |
|---|---|---|---|
| 0 | ProtocolVersion | 1 | C1.0 |
| 1 | MessageType | 1 | CHALLENGE_AUTH |
| 2 | Param1 | 1 | Slot number of corresponding CHALLENGE Request |
| 3 | Param2 | 1 | Slot mask |
| 4 | MinProtocolVersion | 1 | Minimum protocol version supported by this Device |
| 5 | MaxProtocolVersion | 1 | Maximum protocol version supported by this Device |
| 6 | Capabilities | 1 | Capabilities bitmask |
| 7 | Reserved | 1 | Reserved |
| 8 | CertChainHash | 32 | 32-byte hash of the Certificate Chain |
| 40 | Salt | 32 | 32-byte value chosed by responding device |
| 72 | Context Hash | 32 | SHA384 hash value of manifest data structure |
| 104 | Signature | 64 | Signature generated using device private key |

FIG. 13

DEVICE AUTHENTICATION

RELATED APPLICATIONS

This application claims the benefit of priority to U.S. Provisional Patent Application Ser. No. 62/621,153, filed Jan. 24, 2018, the disclosure of which is incorporated by reference herein in its entirety.

FIELD

This disclosure pertains to computing system, and in particular (but not exclusively) to authentication of connected devices.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. In implementations such as the above, as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 5 is a diagram illustrating example authentication between a host and device in a system.

FIG. 9 is a diagram representing an example authentication extended capability structure.

FIGS. 10A-10M are detailed views of registers within an example authentication extended capability structure.

FIG. 13 is a diagram representing a format of an example challenge response.

DETAILED DESCRIPTION

Figure 1:
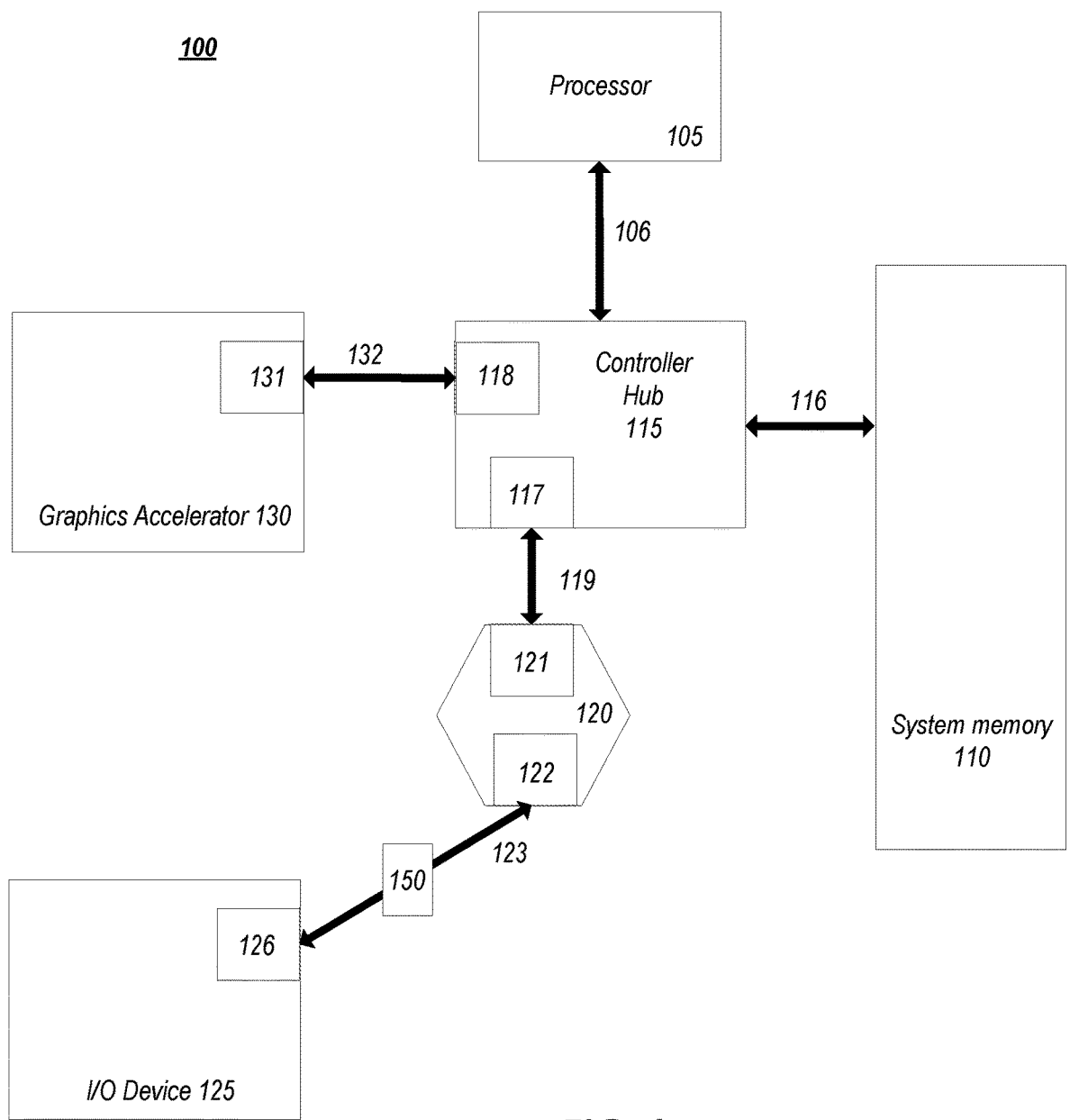
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to computer security enhancements in specific computing systems, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
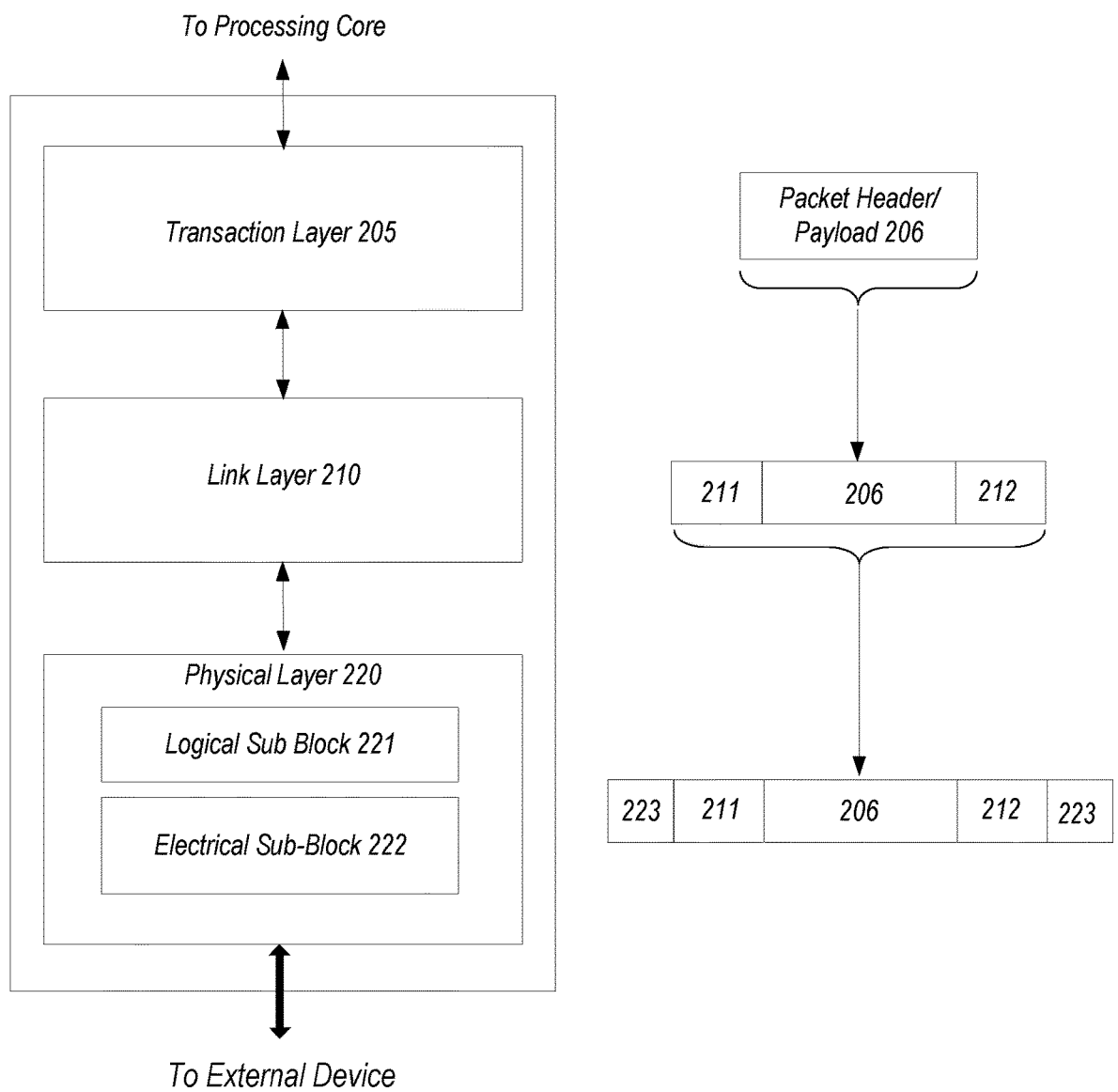
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
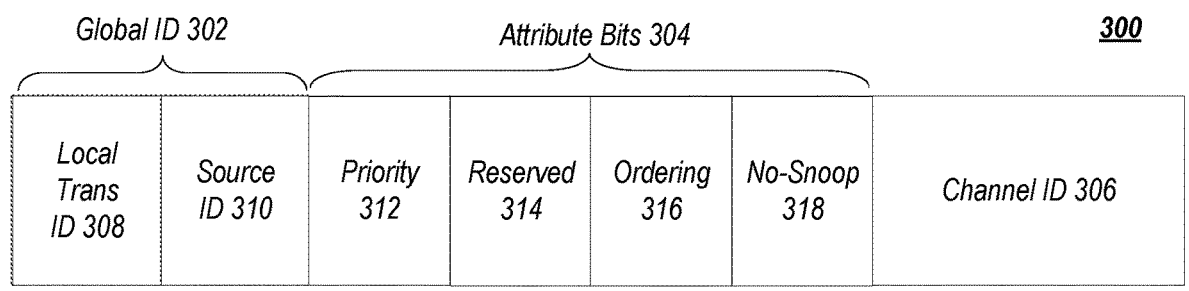
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is deserialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
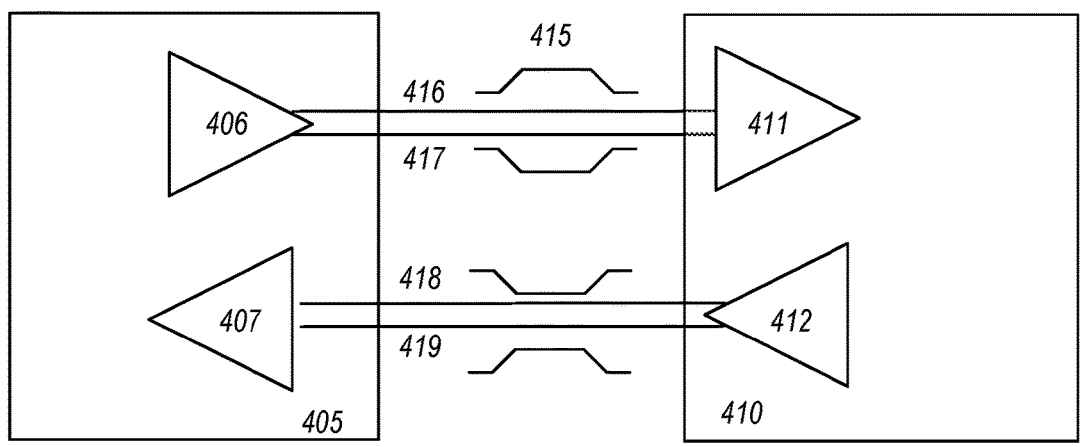
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

In the past decade, the hardware security landscape of the computing industry focused on establishing the root-or-trust in the Central Processing Unit (CPU) and its associated chipsets. Since PCIe devices are typically managed by the IOMMU that is under the control of low-level system software to limit the accesses allowed for the devices, these PCIe devices are considered to be outside of the Trusted Computing Base (TCB) of the platform, regardless of the functionality of the Device or the trustworthiness of the manufacturer of the device.

With the proliferation of PCIe-based computing accelerators, more and more workloads are relying on PCIe Devices for critical and high-performance operations. To this end, PCIe devices are being provided with features to allow the devices to reap the full performance benefits of PCIe. As an example, Address Translation Services (ATS) may be provided to enable a PCIe device to locally cache address translations. Traditionally, a PCIe Device could access the system memory by sending Guest Physical Address (GPA) requests to the CPU, where the IOMMU on the CPU would translate the GPA requests to Host Physical Address (HPA) requests and forward the requests to the memory to complete the transactions. Device Address Translation Caching (ATC) enables device requests to bypass the system's IOMMU translation with lower memory access latency, and further supports system optimization by enabling devices to appropriately size their local translation caches.

Enabling devices to bypass a system's address translation mechanisms, such as through PCIe ATS, new security risks may emerge along with the resulting performance benefits. As an example, PCIe ATS may allow PCIe Devices direct access to all physical memory locations. Although the PCIe host can potentially implement some checks against inappropriate PCIe device behavior, implementing full checking would negate the performance benefits of ATS. To reduce or eliminate the need for such checks, the TCB of the platform would need to include all ATS-enabled PCIe devices, among other example issues. Even without the presence of ATS-enabled PCIe devices, in modern cloud computing systems, cloud operators have an incentive to increase assurance to their customers about the trustworthiness of the cloud environment, including every single PCIe device deployed to implement the cloud computing environment. However, there is currently not a uniform mechanism for host software to make such a trust decision for PCIe devices.

In one implementation, device firmware measurement and device authentication mechanisms may be implemented for PCIE devices. Such features may enable host software to make trust decision for PCIe devices. For instance, such mechanisms may enable the identity of the device and the identity of the firmware component running on the device to be checked. In one implementations, host software may identify a device, through the Vendor ID and Device ID in the PCI Configuration Space Header, among other example implementations. However, some PCIe devices may include one or more microcontrollers that operate independently of the host processor, and there is currently no defined mechanism for a PCIe device to expose its firmware identity. Accordingly, in one example, a digest, manifest, or other measurement of the PCIe device may be performed and allow any firmware images running on these device microcontrollers to be exposed to the host. For instance, a PCIe device firmware measurement feature may allow the firmware identity of PCIe Devices to be included as part of the platform ingredients for enhanced platform assurance.

In one implementation, in addition to utilizing PCIe Vendor/Device IDs and device firmware measurement, additional features may be provided, as these features alone may not guarantee that a device from a particular vendor (e.g., Vendor A) cannot masquerade as a device from a different vendor (e.g., Vendor B) by spoofing the Vendor and Device ID fields or the firmware measurement values. In other words, the current PCIe specification and PCIe device firmware measurement may not natively provide a cryptographic or other guarantee of the identities and capabilities of a particular device. Concerns about such issues have grown considerably with the consolidation of computing resources in the cloud and data center environment, where tens of thousands of computing hosts along with several PCIe-based devices plugged into each of these hosts are deployed. While PCIe Devices may be procured through a trusted supply chain to ensure genuine devices are used on the hosts, there have nonetheless been incidents where counterfeit PCIe devices slip through the supply chain. Such counterfeit PCIe Devices could have their components or microcontroller firmware replaced with cheaper or less reliable parts, causing interruptions to the cloud or data center operations. In more sinister examples, functionality of a PCIe device may be surreptitiously counterfeited or replaced with a device equipped with malicious logic or deliberately deficient and vulnerable hardware or firmware, among other examples. Accordingly, in some implementations, enhanced device authentication features, such as introduced herein, may be provided to mitigate against such attacks or deficiencies.

Enhanced PCIe device authentication functionality may be applied wherever higher assurance about the PCIe device behavior is desirable or required. For example, firmware and/or low-level system software, e.g., Virtual Machine Monitor (VMM), may utilize such functionality to establish the identities of the devices on the system before assigning the devices to virtual machines. As another example, when a device implements the Address Translation Cache (ATC) to achieve the performance benefits given by the Address Translation Services (ATS), the device is given the privilege to cache the address translation results on the device. In order for the host to make the trust decision to grant this privilege to the device, the device can authenticate to the host using its unique cryptographic identity as provided through enhanced device authentication features. Remote system administrators that manage a large collection of systems, each containing one or more devices, may also make use of enhanced device authentication features by generating a manifest of cryptographic identities of all devices without physical examination of the systems. Runtime/hotswap verification of PCIe devices may also be performed, without requiring host reboot, where the identity of the PCIe device is verified by operating system (OS) drivers before assigning resources to the device, among other examples and use cases. Indeed, PCIe device firmware measurement and device authentication frameworks can set up the foundation where the device identify and capability(ies) can be verified. In some implementations, additional features may also be provided, such as bidirectional authentication (e.g., allowing the identity of the host to also be verified by the device using similar techniques), establishing secure channels between individual hosts and devices (e.g., through an exchange of secrets to set up the secure channel between each other), among other examples.

Device authentication may be utilized to build a trust relationship between the host (e.g., the software running on physical host system, host firmware, an entity associated with the host, etc.) and the PCIe devices. The host may determine both the identity and capability of the PCIe device to make a trust decision, either to simply verify that the device is running the approved firmware versions, to grant the device certain privileges, or to share a secret with the device.

FIG. 5 depicts an example of host-device relationships for authentication purposes. A device 505, such as a PCIe device, may be connected to a host system 510 (e.g., via a port) and may be used by various programs and services of the host system 510. Before granting access to certain host resources, allowing use of the PCIe device by other components or software of the host system, or allowing other operation of the device 505 within the host system 510 environment, the host system may first utilize an authentication architecture to ensure that the device is of a particular, from a particular manufacture, has particular characteristics, is certified, endorsed, or owned by a particular organization, among other check before applying certain policies to the device's 505 interaction with the host 510. For instance, the host 510 can query the device's 505 firmware version through a firmware measurement 515. The host 510 can also query a device's hardware and firmware through device authentication 520. The device 505, in some implementations, may likewise query the host's identity (e.g., through host authentication 520), for instance, using the host private key that is tied to the host identity. In some cases, mutual authentication 530 may be achieved through device 520 and host 525 authentication. After verifying identity (and capabilities, when desired), the device and host can exchange secrets (e.g., at 535) for link encryption or other security purposes through key exchange. As illustrated in the example of FIG. 5, device authentication may be utilized to allow trust decisions to be made between hosts and devices connected to the host via an interconnect (e.g., a PCIe-compliant interconnect). In some implementations, device firmware measurement may be utilized in connection with device authentication to enable the trustworthiness of the device authentication.

In some implementations, device authentication (e.g., 520) may borrow from existing authentication schemes, protocols, and paradigms. In one example, a PCIe device authentication scheme may borrow from and at least partially follow the authentication architecture of a different interconnect protocol. For instance, at least a portion of the authentication scheme set forth in the Universal Serial Bus (USB) Authentication Specification may be utilized during authentication of the PCIe device (over PCIe registers and links). For instance, principles and flows defined in the Authentication Architecture, Authentication Protocol and Authentication Messages of the USB Authentication Specification may be used. Leveraging existing authentication schemes (e.g., of other interconnects) may be beneficial, for instance, because the same software implementation can be used for both authentication in not only the intended protocol, but other protocols (e.g., both USB and PCIe Device Authentication), the same silicon hardware implementation block can be used for authentication of multiple protocols (e.g., for both USB and PCIe devices), among other example benefits.

Figure 6:
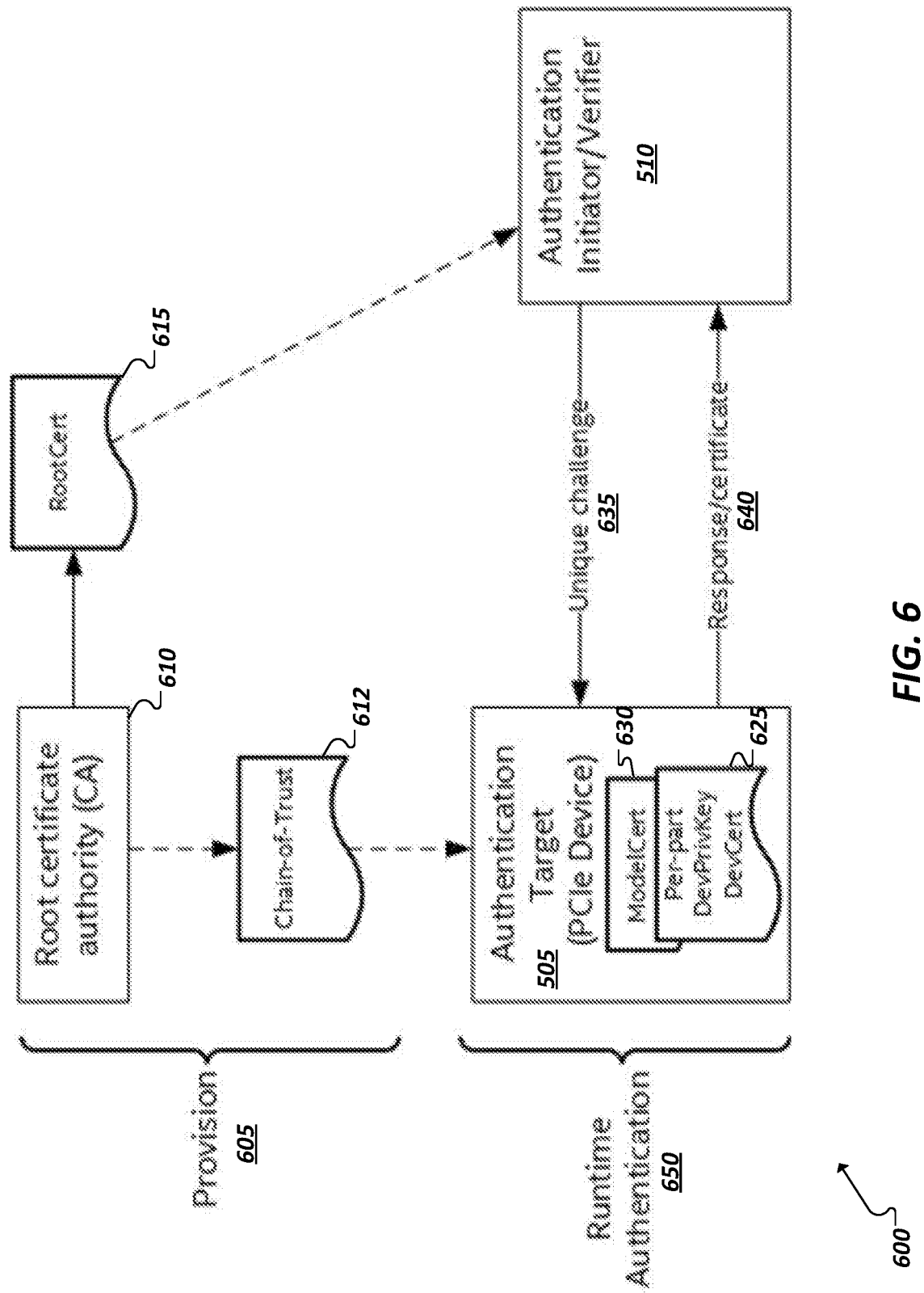
FIG. 6 is a diagram illustrating an example provisioning of a certificate on a device and runtime authentication of the device in a system.

Turning to the example of FIG. 6, devices and hosts may be provided with enhanced functionality to implement a PCIe device authentication architecture to provide cryptographic guarantees to the device's hardware and firmware identities as well as its capabilities. In one implementation, at least some of the protocol and messages used in the device authentication architecture may be adapted from the USB Authentication Specification. In one example, PCIe device authentication may define an Extended Capability structure, which may be provided to allow software and/or firmware, running on the host system to query the cryptographic identity of a device connected to the host, including its functions, such that the unique identity of the device as well as the device's capabilities can be determined in a cryptographically secure manner, allowing software and/or firmware of the host to make a trust decision relating to the device.

FIG. 6 is a simplified block diagram depicting a high-level architecture for a PCIe device authentication architecture, including the authentication provisioning and the runtime authentication. In some implementations, authentication provisioning 605 may constitute a process followed by a device vendor or manufacturer as part of the manufacturing flow, and may be extended through additional provisioning performed after device manufacturing. For instance, a trusted root certificate authority (CA) 610 may generate a root certificate (RootCert) 615 that is provisioned to the authentication initiator/verifier 510 to allow the authentication initiator to verify the validity of the signatures generated by the device 505 during runtime authentication 620. The root CA 610 may also indirectly endorse using a chain-of-trust 612 (e.g., through a trust hierarchy, such as shown in FIG. 7) a per-part device public/private key pair, where the device private key is provisioned to the device 505 and the device public key is contained in the device certificate (DeviceCert) 625 that is signed using a private key that can be verified using the root CA's public key in the RootCert, among other example implementations.

During runtime authentication 650, system software (of a host 510) may interact with a connected PCIe device 505 in a running system. After the device public/private key and RootCert provisioning, the authentication initiator (e.g., 510) can retrieve (at 622) the certificate(s) (e.g., 625, 630) from the device 505, can send a unique challenge 635, in the form of a nonce (e.g., a unique or random number used once), to the device 505 and the device 505 can authenticate its identity and capability by generating a response 640 generated by signing the challenge along with other authentication data using the private key of the device. The authentication initiator (e.g., the host software, a management controller (e.g., baseboard management controller, etc.), or other hardware- and/or software-based controller) verifies the signature using the public keys of the device and the root CA 605, as well as any intermediate public keys, among other examples and features.

Figure 7:
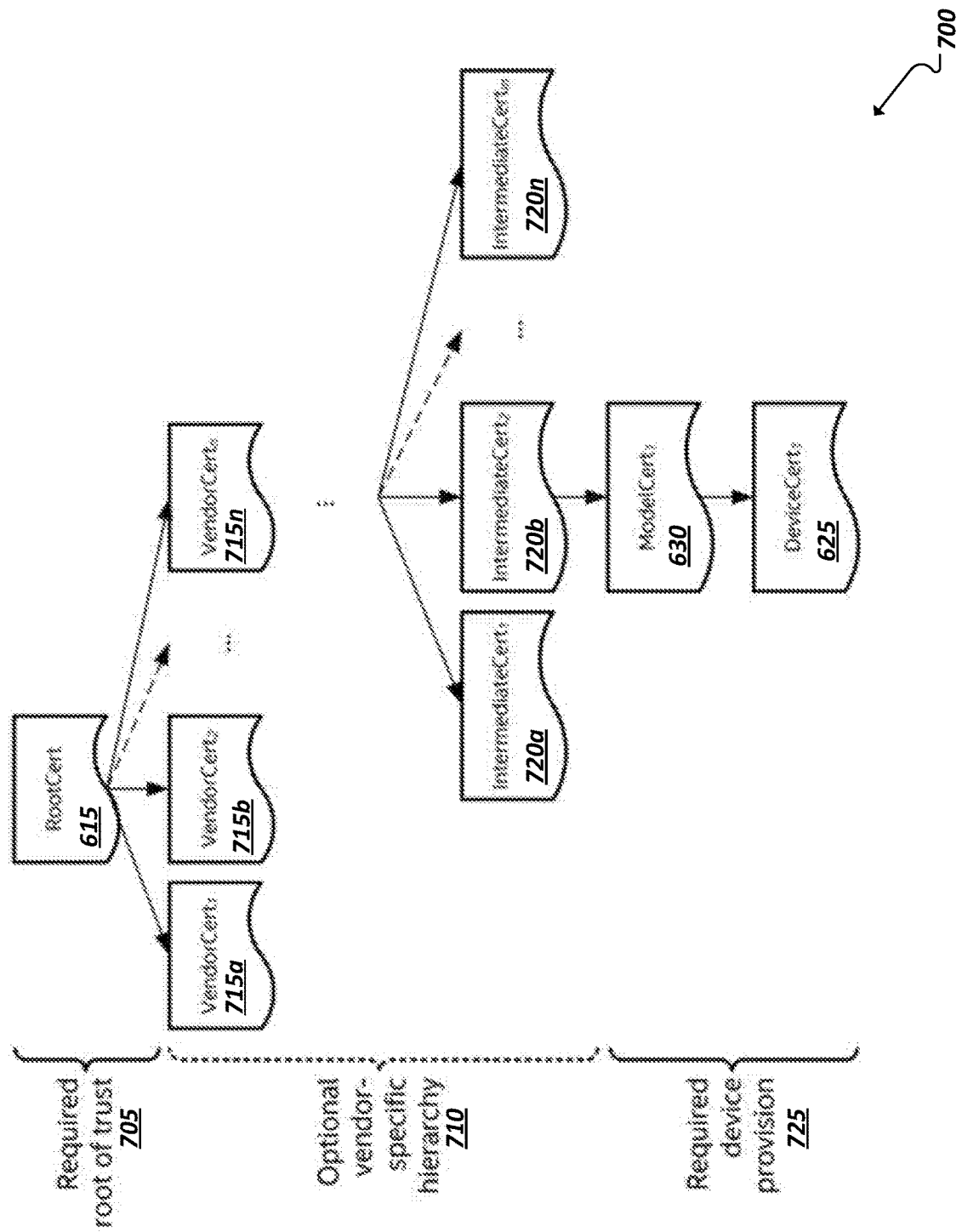
FIG. 7 is a block diagram illustrating an example chain of trust.

Turning to FIG. 7, a block diagram 700 is shown illustrating an example trust hierarchy to be used in an example PCIe device authentication. The chain of trust may be established through the signing of certificates from the DeviceCert 625 all the way up to the RootCert 615. For instance, below the required root of trust 705 facilitated through root certificate 615, a vendor-specific level of hierarchy 710 may be established through vendor or manufacturer certificates (e.g., 715a-n). Other intermediate certificates 720a-n (with intermediate keys) may also be provided. At least a portion of the certificates (e.g., 625, 630) may be provisioned on the device itself to implement the device provisioning 725, including per-part device certificates (e.g., 625) and model certificates (e.g., 630). In some implementations, the entire certificate chain (e.g., 615, 715a-n, 720a-n, 630, 625) may be used by the authentication initiator when verifying the signature generated by the device during an authentication transaction. For instance, the RootCert (e.g., 615), ModelCert (e.g., 630) (e.g., which may be issued to all devices of a particular model (e.g., by the manufacturer), and the DeviceCert (e.g., 625) (e.g., a device-specific certificate) may be used as the basis for forming a minimal certificate chain, where in the certificate chain the intermediate keys form the chain-of-trust. A unique per-part DeviceCert (e.g., 625) allows the device authentication architecture to detect and prevent advanced device-cloning attacks, as well as to revoke an individual device when necessary. In some instances, a PCIe vendor can choose to have an arbitrary number of intermediate certificates (e.g., 720a-n) and any number of intermediate levels within an example trust hierarchy.

Figure 8:
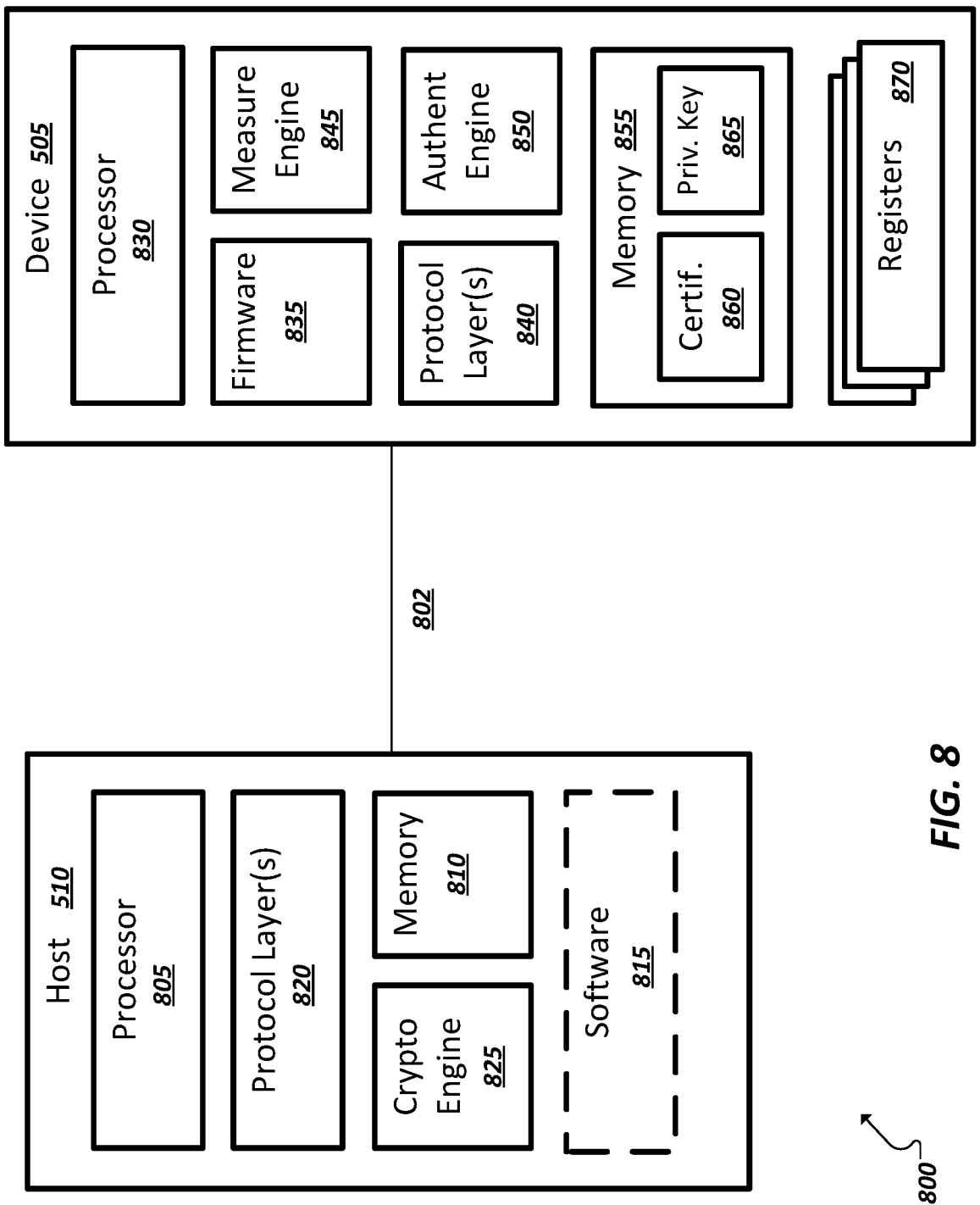
FIG. 8 is a block diagram illustrating an example device connected to a host system over an interconnect.

Turning to the simplified block diagram 800 of FIG. 8, as example system is shown including a host 510 connected to a device 505 using a physical interconnect 802, such as an interconnect configured to implement a protocol compliant with a PCIe-based protocol. An example host may include one or more microprocessors (e.g., 805), computer memory (e.g., 810), to implement system software (e.g., 815). Protocol layer logic (e.g., 820) may be provided (e.g., in one or more ports of the host 510) to implement a link and stack of a particular protocol (e.g., PCIe, Gen-Z™, UPI, Cache Coherent Interconnect for Accelerators (CCIX™), Advanced Micro Device™'s (AMD™) Infinity™, Common Communication Interface (CCI), Qualcomm™'s Centriq™ etc.) over physical interconnect 802. System software 815 may include software to manage the host system 510 and connections to peripheral devices, such as device 505. In some implementations, device (and host) authentication and device measurement functionality (e.g., implementing a host-based authentication engine) performed by the host 510 may be implemented in system software 815. In still other examples, the "device" may be integrated with the host, and/or the device may have its own computing capability with local firmware/software independent of the host, and/or that a single processor may be operating on behalf of a complex device that is exposed through multiple functions (e.g., a switch) and/or even multiple logical devices (e.g. a switch with one or more additional devices logically appearing below the switch, among other example implementations). The host 510, in some implementations, may additionally be provided with a cryptographic engine 825 including hardware circuitry, firmware, and/or software to perform cryptographic operations and other tasks relating to management and use of certificates and corresponding cryptographic keys (e.g., the decryption and encryption of signed manifest, verification of hashes, and other cryptographic tasks) in connection with authentication and verification tasks performed in an example device authentication architecture.

An example device (e.g., 505), such as a PCIe device, may include a microcontroller (e.g., 830) and corresponding firmware (e.g., 835). The PCIe 505 may likewise include protocol layer logic 840 (e.g., implemented in hardware circuitry of the device 505) to implement a protocol stack of a PCIe-based protocol, which may be used to establish a link and communicate with host 510 over the link. A device 505 may additionally include functionality to support an authentication architecture. For instance, the device 505 may include a firmware measurement engine 845 and authentication engine 850. In one implementation, the firmware measurement engine 845 may utilize hardened or otherwise secure hardware and/or firmware (e.g., 835) of the device to measure the firmware to generate a measurement of the firmware and potentially other characteristics of the device 505, which may be accessed by and shared with the host 510 (e.g., host software 815). Authentication engine 850 may include functionality to enable the device 505 to participate in an authentication protocol with the host. The authentication engine 850 may support the generation and consumption of messages according to an existing authentication architecture, such as the USB Authentication Specification, among other examples, including authentication messaging and flows defined for other interconnects. The authentication engine 850 may also control access to and use of certificates (e.g., 860) and private keys (e.g., 865) provisioned on the device 505 (e.g., in secured memory 855 during manufacturing), which may be used by the device 505 to generate a signature in accordance with an authentication challenge sent by the host 510 (and generated by the authentication engine of the host 510). The authentication engine may generate a manifest or report indicating characteristics of the device 505, which are used by the host 510 during authentication of the device. This manifest may include a signature (or may be signed) using the device's 505 private key 865, a hash, or other cryptographic technique to securely indicate the device's trustworthiness.

A device configured to support device authentication may include memory and hardware to implement a trust domain for the storage and maintenance of the device private key. Such protections may be provided for the per-part device private key in-use (secure signing) and at-rest (secure storage), where the per-part device private key implements the device root of trust (RoT). Similarly, measurement engine 845 may be implemented through and measure the microcontroller firmware 835 using only hardware or immutable firmware (e.g., that is stored in Read-only Memory (ROM) of the device). The measurement engine 845 may thus implement the device root of trust for measurement (RTM) for the device. The device root of trust for reporting (RTR) may be implemented through the combination of the Device RoT and the Device RTM. It may be assumed that the authentication initiator has access to the genuine root certificate (RootCert), where the RoT for device authentication is the root CA's private key, among other examples. Further, PCIe device authentication may consider any physical extraction of the device's private key in-scope for the threat model and assume that any device qualified to participate in device authentication has been provided (e.g., by the manufacturer) with physical protection mechanisms for the device RoT. Furthermore, for the device private key, device manufacturers may be assumed to employ adequate protections against malicious insider attacks where adversary can gain access to the device private key generation and provisioning process to compromise the PCIe Device Authentication architecture, among other example considerations.

In some implementations, such as in the example of a PCIe device, a set of registers (e.g., 870) may be provided on the device 505 and the registers may be populated and read (e.g., using authentication engine) to allow the communication of messages or instructions with the host 510 in an authentication architecture. In one example, the registers 870 may include registers defined and provisioned on the device 505 as extended capability registers under PCIe. For instance, the registers 870 may include registers to indicate characteristics of the device 505, including its model, vendor, the authentication protocols it supports, the cryptographic technologies it supports, to indicate its certificate authority (associated with the certificate 860 and private key 865), and other features of the device 505. The registers 870 may further include mailbox registers in which the host 510 may deposit messages during an authentication exchange (e.g., either during host or device authentication) and from which the host 510 may read responses from the device 505. In one example, a separate read mailbox register and write mailbox register may be provisioned on the device 505, with the host 510 (e.g., through host software 815), reading messages from the read mailbox and writing messages to the write mailbox. In some implementations, at least a portion of the registers 870 of the device 505 may be implemented as read-only registers (e.g., in secure read only memory), while other registers (e.g., a write mailbox register) allow values to be overwritten by the host 510, among other example implementations.

Turning to FIG. 9, an example set of 32-bit registers 870 is illustrated, such as may be implemented for a PCIe device enabled to participate in a device authentication architecture. The set of registers may define a register interface, which be used by the host 510 (e.g., host software 815) to retrieve the identity and capability of the device 505 via cryptographically secure messages. In one example, the register interface may be implemented for a PCIe device using a corresponding Designated Vendor-Specific Extended Capability (DVSEC). FIG. 9 illustrates an example allocation of register fields in an example authentication extended capability structure (e.g., 870). For instance, one or more extended capability headers (e.g., DVSEC headers) (e.g., 905, 910, 915) may be provided. An authentication header 920 may also be provided, together with authentication capability fields (e.g., 920, 930, 935). An authentication status field 945 may be provided, together with authentication control fields 950, 955, 960. Further, write and read data mailboxes (e.g., 965, 970) may be implemented in the extended capability register 870, among other example fields. In some implementations, the extended capability structure 870 may be implemented as multiple non-contiguous registers as an alternative to the contiguous register space illustrated in the example of FIG. 9, among other example implementations. In some implementations, one or more of the registers may be implemented as a PCIe Extended Capability register, among other example implementations.

Figure 10A:
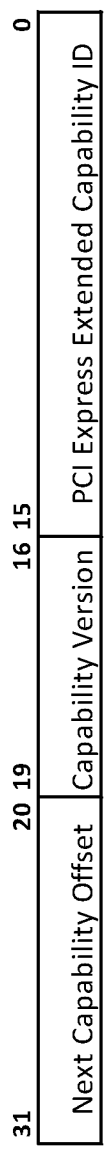

FIGS. 10A-10M show representations of example implementations of the example register fields (or registers), such as included in the example extended capability structure illustrated in FIG. 9. For instance, FIG. 10A illustrates an example field to include a first header, or first portion of a header, for an extended capability structure (e.g., at offset 00h within the linked list of the capability structure (e.g., 870)). In one example, the first header portion is defined according to a PCIe DVSEC header (e.g., DVSEC Header 1). Subfields of the header are shown at 905a, with a detailed example shown at 905b. The subfields may include a PCI Express Extended Capability ID, which may include a PCI-SIG defined ID number that indicates the nature and format of the Extended Capability. A Capability Version subfield may also be provided, which is a PCI-SIG defined version number that indicates the version of the capability structure present. A Next Capability Offset subfield contains the offset to the next PCI Express capability structure or 000h if no other items exist in the linked list of capabilities. In the example of a PCIe extended capability structure, for extended capabilities implemented in configuration space, this offset is relative to the beginning of PCI-compatible configuration space.

Figure 10C:
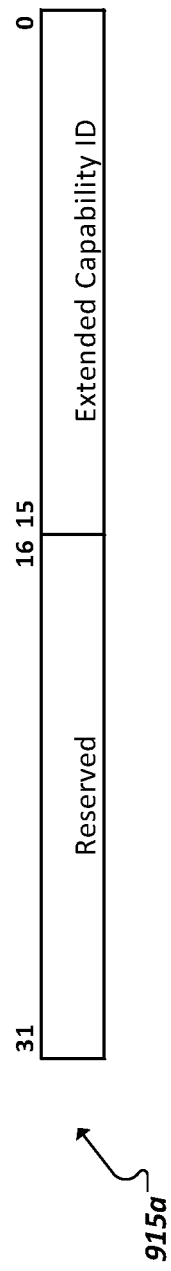

Turning to FIG. 10B, second extended capability header (e.g., a DVSEC header) is shown. Subfields of the header are shown at 910a, with a detailed example shown at 910b. For instance, a Vendor ID subfield may be provided with the Vendor ID associated with the vendor that defined the contents of this capability (e.g., in a DVSEC vendor-defined capability). A DVSEC Revision subfield may include a vendor-defined version number that indicates the version of the extended capability structure (e.g., the version of the DVSEC capability structure). A Length subfield may indicate the number of bytes in the entire extended capability structure. FIG. 10C shows an example of a field encoded with a third portion of an extended capability structure. Subfields of the header are shown at 915a, with a detailed example shown at 915b. For instance, an extended capability ID field (e.g., a DVSEC ID) may include a vendor-defined ID that indicates the nature and format of the extended capability structure.

Turning to FIG. 10D, in this example, the extended capability structure may additionally include an authentication header field. Subfields of the authentication header are shown at 920a, with a detailed example shown at 920b. For instance, an Authentication Support field may be included, which indicates support for an authentication architecture, such as a PCI Express authentication architecture or example architecture such as introduced above. For instance, hardware may set the Authentication Support field to 1b to indicate that the authentication is implemented. In some implementations, hardware is permitted to return a value of 0b in this bit to indicate that, although the Extended Capability itself is implemented, the authentication interface is not available. System firmware/software may read this bit to confirm that this bit is set before attempting to interpret or use any of the other fields of this extended capability. An Authentication Interrupt Support subfield may indicate, when set, that the device supports using interrupts (e.g., MSI/MSI-X) to indicate completion of an authentication message by the device. Various sections of the registers may be reserved (e.g., for future assignment or expansion of the extended capability structure), as is shown, for instance, in the example of FIG. 10D. The authentication header field may further include additional subfields, such as an Authentication Version field indicating the highest version of an authentication architecture (which may embody multiple versions as it is extended and evolves) supported by the device, among other example subfields.

Figure 10F:
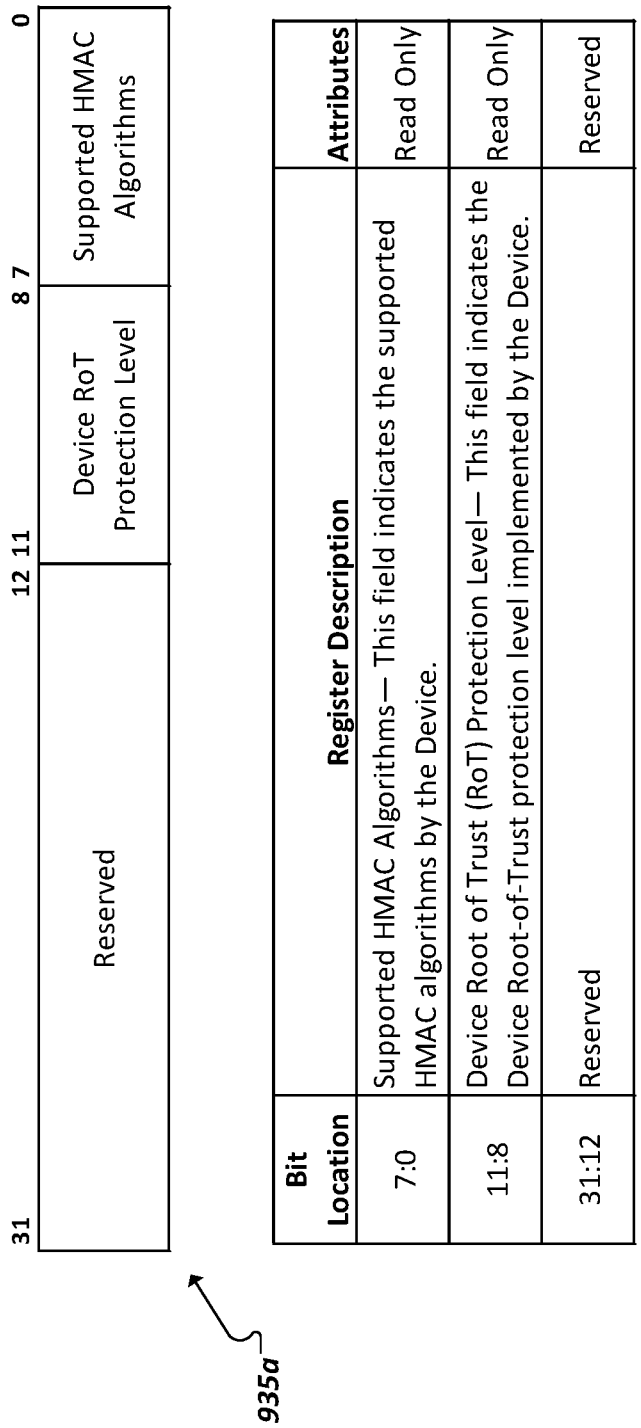
Figure 10G:
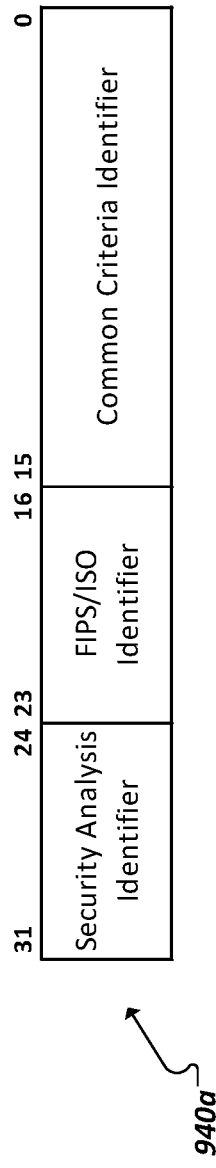

FIGS. 10E-10G show additional fields in an example extended capability register relating to identifying features of the device's implementation of an authentication capability. For instance, FIG. 10E shows a first example authentication capability field. Subfields of the field are shown at 930a, with a detailed example of the subfields shown at 930b. For instance, a Supported Signing Algorithms subfield can be provided, which indicates the supported signing algorithms (e.g., ECDSA NIST P256, RSA 3072, etc.) of the device (e.g., using the authentication engine implemented on the device). A Supported Hash Algorithms subfield may indicate the hashing algorithms (e.g., SHA-384) supported by the device, which may be used in authentication transactions within the architecture. A Supported Symmetric Encryption Algorithms subfield indicates the symmetric encryption algorithms supported by the device within the authentication architecture. A Supported Authentication Protocols subfield indicates the authentication protocols supported by the device, such as a device authentication protocol, host authentication protocol, mutual authentication protocol, or other authentication protocols and tasks defined within the authentication architecture. FIG. 10F shows an additional or continued authentication capability field, including subfields (shown at 935a, 935b) such as a Supported HMAC Algorithms subfield indicating the HMAC algorithms supported by the device, and a Device Root of Trust (RoT) Protection Level subfield indicating the device root-of-trust protection level implemented by the device, among other examples.

Turning to the example of FIG. 10G, another register field may be provided within an example extended capability structure for use in supporting an authentication architecture for an interconnect. As noted above, in some implementations, existing authentication schemes, flows, and messaging protocols may be leveraged and adapted for use within the authentication architecture. Accordingly, one or more register fields may be included to indicate features, values, and capabilities that are specific to an adopted authentication scheme. For instance, in the example of FIG. 10G, a register field is shown (at 940a, 940b) that is provided to support an authentication scheme used and supported by the device. In some implementations, a register field may be provided to identify which authentication scheme is used and further indicate how many additional register fields are provided to provide information related to the support of that authentication scheme. In the example of FIG. 10G, subfields are provided that are specific to information used in the USB Authentication Specification as adopted in a PCIe authentication architecture. It should be appreciated that the USB Authentication Specification is but one of potentially many different authentication schemes (e.g., for interconnect protocols other than the native interconnect protocol of the device (e.g., PCIe)), and that similar register fields may be provided for any one of these other example interconnect authentication schemes.

FIG. 10H shows an example authentication status register field, which may be included in an extended capability structure supporting an authentication architecture. Subfields of the authentication header are shown at 945a, with a detailed example shown at 945b. The authentication status register may be utilized by the device to indicate when the device is available to accept direction from the host in connection with an authentication transaction, as well as indicate to the host, when a result or response is available for consumption by the host (e.g., by host software or firmware). For instance, the authentication status register field may include a Busy sub-field that, when set, indicates that the device is busy and unable to start a new authentication session or field a next direction from the host in an existing authentication session. The device may set the Busy field when the device is already performing an action in an authentication session. Similarly, the device (e.g., through its authentication engine logic) may clear the Busy field when it is ready to handle new directions or actions within an authentication session or to start a new authentication session with the host. The host may intermittently (e.g., periodically) poll the subfields in the authentication status register to determine when the device is available and whether a response has been prepared by the device and is ready for consumption by the host. Accordingly, the authentication status register may additionally include a Response Ready subfield that, when set, indicates that the device has a valid message (e.g., in a mailbox register) to be read and processed by the host. When the message has been consumed (which may involve multiple successive writes by the device and multiple corresponding reads by the host) or in response to an abort, the device (and in some implementations that host) may clear the one or more bits that implement the Response Ready subfield.

Figure 10K:
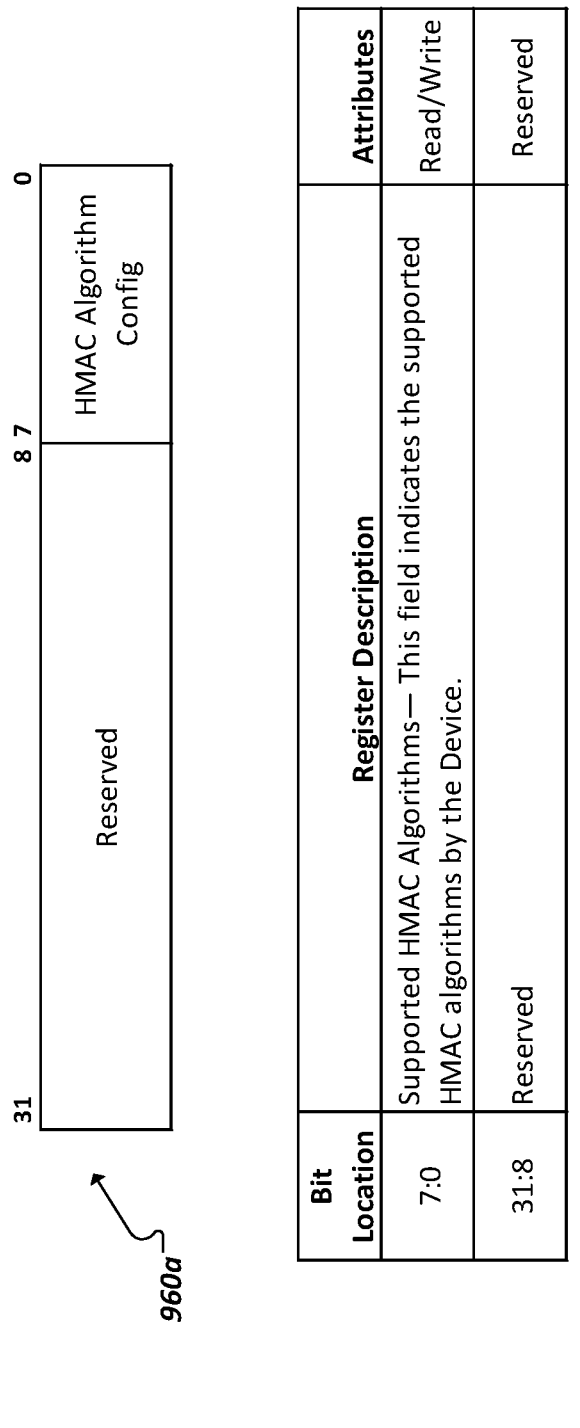

Turning to the examples of FIGS. 10I-10K, in some implementations, additional authentication control register fields (e.g., 950, 955, 960) may be provided within an extended capability structure. For instance, as shown in the example of FIG. 10I, a first authentication control register field (e.g., shown at 950a, 950b), which may include subfields such as an Abort subfield, Interrupt Enable subfield, and a Go subfield. The Abort subfield, when set (e.g., by the host), may cause processing of the last, pending message sent by the host to be aborted at the device. The Abort subfield may be used to free up the device to move from one action to another at the direction of the host. The device, in response to the setting of the Abort subfield, may assert the Busy subfield (e.g., in the authentication status register field 945) when processing the abort and may likewise clear the Busy subfield when the abort is completed. An Authentication Interrupt Enable subfield may also be provided that, when set (e.g., by the host to request use of interrupts by the device in the authentication exchange with the device) and MSI/MSI-X is enabled, causes the device to issue an MSI/MSI-X interrupt to indicate the 0b to 1b transition of the Response Ready bit (and thereby indicate to the host that a new response is ready from the device for the host). An Interrupt Message Number subfield can also be provided, which indicates the MSI/MSI-X vector that is used for the interrupt message generated in association with Valid. For MSI, the value in this register indicates the offset between the base Message Data and the interrupt message that is generated. Hardware may update this field so that it is correct if the number of MSI Messages assigned to the Function changes when software writes to the Multiple Message Enable field in the MSI Message Control register. For MSI-X, the value in this register indicates which MSI-X Table entry is used to generate the interrupt message. The entry may be one of the first 32 entries even if the Function implements more than 32 entries. For a given MSI-X implementation, the entry remains constant. If both MSI and MSI-X are implemented, they are permitted to use different vectors, though software is permitted to enable only one mechanism at a time. If MSI-X is enabled, the value in this register indicates the vector for MSI-X. If MSI is enabled or neither is enabled, the value in this register indicates the vector for MSI. If software enables both MSI and MSI-X at the same time, the value in this register may be considered as undefined.

Continuing with the example of FIG. 10I, a Go subfield may be provided, which may be written to by the host to indicate to the device that the device can start consuming the last valid message sent to the device by the host through a write data mailbox register (e.g., as shown and discussed in FIG. 10L). The device, upon receiving a message through the write data mailbox, may wait to execute the content of the message until the Go subfield is written to by the host. Upon the setting of the Go bit(s), the device may assert the Busy subfield in the authentication status register (e.g., 945) while the device processes the corresponding message and may clear the Busy subfield when the entire message (received through the write data mailbox) has been consumed by the device.

In the examples of FIGS. 10J-10K, additional authentication control registers are shown (at 955a, 955b and 960a, 960b) including subfields such as a Signing Algorithms Configuration subfield, a Hash Algorithms Configuration subfield, a Symmetric Encryption Algorithms Configuration subfield, an Authentication Protocol Configuration, and an HMAC Algorithms Configuration subfield. A Signing Algorithms Configuration subfield may indicate (e.g., through a single bit in a bitmask) to indicate a chosen one of potentially multiple supported signing algorithm for the authentication session. In some implementations, this field is to be written before the Go bit in the Authentication Control 1 Register is asserted. Any modification to this field after the Go bit in the Authentication Control 1 Register is asserted may result in undefined behavior by the device. Similarly, a Hash Algorithms Configuration subfield may indicate the chosen hash algorithm for the authentication session, a Symmetric Encryption Algorithms Configuration may indicate the chosen symmetric encryption algorithm for the authentication session, the Authentication Protocol Configuration may indicate the chosen authentication protocol for the authentication session, and the HMAC Algorithms Configuration subfield may indicate the chosen authentication protocol for the authentication session. Each of the subfields in the authentication control registers (shown in FIGS. 10J-10K) may first be set (e.g., as a requirement) before the Go bit in the Authentication Control 1 Register is asserted, and modification of these values may not be permitted (or may result in undefined behavior by the device) if changed after the Go bit is set in connection with a given message by the host, among other example rules, conditions, and features.

Turing to the examples of FIGS. 10L-10M, example mailbox registers may be provided with the extended capability structure for a PCIe authentication architecture. FIG. 10L shows an example write data mailbox 965. The write data mailbox is a register, which the host may use to write piece-wise messages to the device, which the device may then consume (e.g., upon the setting of the Go subfield in the authentication control register). In this example, the write data mailbox 965 has a size equal to the other registers or fields within the authentication extended capability structure (e.g., a double word or 32-bits). As messages sent by the host may consume multiple times the size of the write data mailbox, a single message may involve the hosting writing, 32-bits at a time, successive portions of the message to the write data mailbox. The device may extract each portion of the message as it is written and store the portion (with preceding portions of the same message) in local device memory. In some implementations, the host's setting of the Go subfield may not only trigger the device's processing of the message, but also indicate that the host has finished sending the current message for the device's consumption. The host may wait to write a next portion of a message to the write data mailbox in response to identifying that the device copies the preceding portion from the write data mailbox to memory. In some examples, one or more additional bits may be provisioned within the authentication extended capability structure, which the device may set to indicate that current contents within the write data mailbox have been copied to the device's memory, among other techniques to indicate successful copying of the write data mailbox by the device (e.g., a signal sent by the device, a pre-programmed incremental period, in which the host is authorized to assume successful copying after passing of the increment period, among other examples).

Turning to FIG. 10M, an example read data mailbox register 970 is shown, which may also be included in an authentication extended capability structure. The read data mailbox 970 may function as the analogue of the write data mailbox, namely by serving as the mailbox to which the device writes responses or results corresponding to a previously-sent message by the host (in the write data mailbox). The host may access and read from the read data mailbox to obtain a response message by the device. In some examples, like the write data mailbox, the read data mailbox may have a size (e.g., 32-bits), which is shorter than the length of at least some responses, which may be generated by the device. Accordingly, the device may likewise write responses to the read data mailbox is piecemeal fashion, with one successive portion of the response message written to the read data mailbox one after the other, and the host reading from and copying the contents of the response message to host memory as the portions of the response message are written to the read data mailbox. Similar techniques may be used to coordinate the copying of data from either or both the read data mailbox and the write data mailbox as new message portions are ready to be written to the mailboxes (e.g., additional ready subfields in the extended capability structure, signaling, predetermined copying periods, etc.), such that the contents of a mailbox are not overwritten before the other link partner (i.e., the host or device) has had a chance to successfully copy the contents of the preceding instance of the mailbox.

Figure 11:
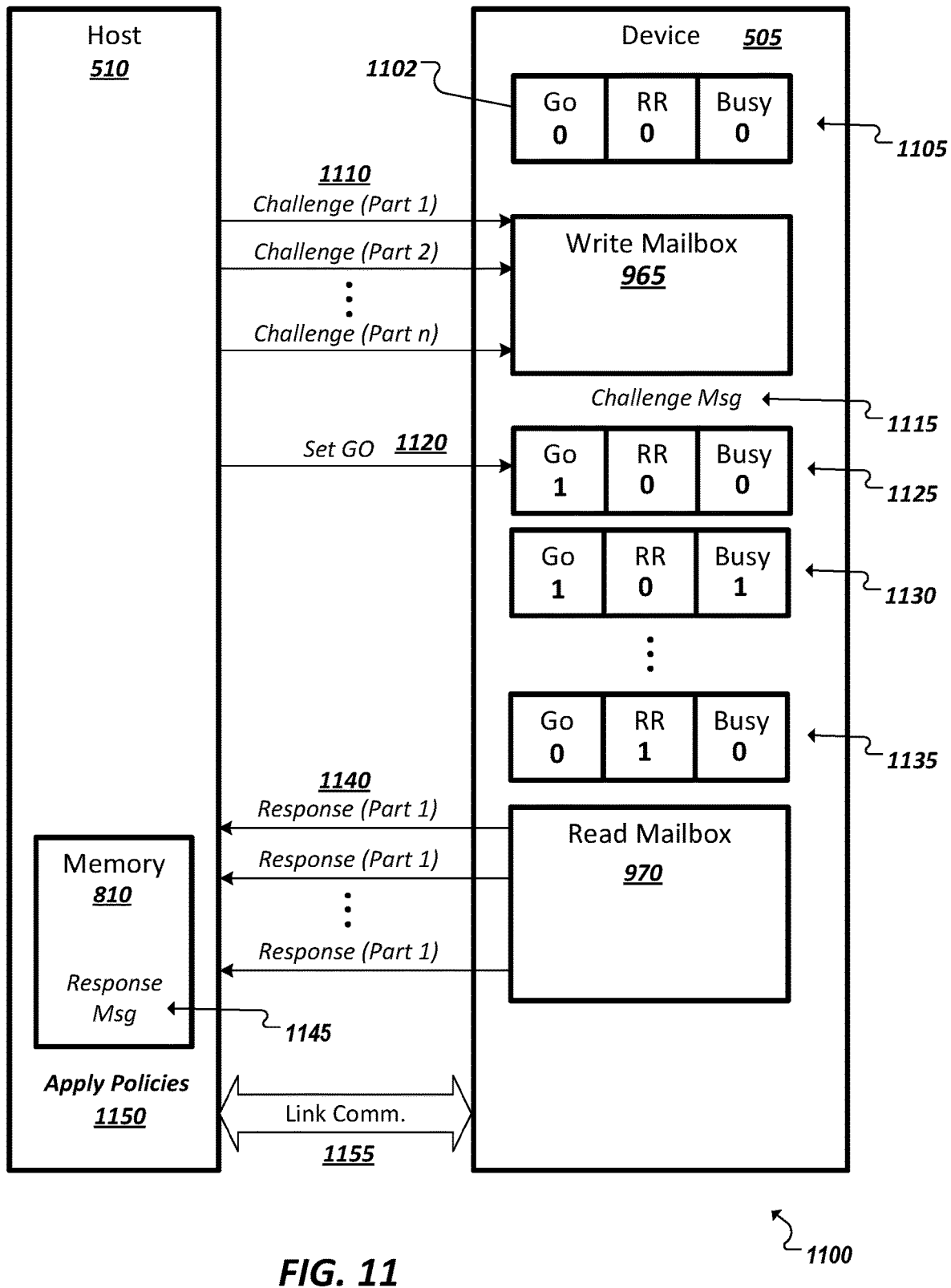
FIG. 11 is a simplified block diagram illustrating an example authentication session between a device and a host.

Turning to FIG. 11, a simplified block diagram 1100 is shown illustrating the example passing of authentication messages between a host 510 and a device 505 using PCIe extended capability registers. The authentication messages and flow dictating the passing of messages between the host 510 and the device 505 may be defined according to an authentication protocol or scheme, including authentication schemes defined for interconnects other than PCIe (e.g., the USB Authentication Specification). In the example of FIG. 11, status and control registers (e.g., 1102) in connection with a write mailbox register (e.g., 965) and read mailbox (e.g., 970) may be provided on the device 505 (e.g., a device including protocol logic (e.g., protocol stack layer circuitry and firmware) compliant with a PCIe-based protocol) to facilitate the communication of authentication messages between the host 510 and device 505. In the simplified example of FIG. 11, the status and control registers 1102 may include a Go register, a Response Ready (RR) register, and a Busy register (e.g., such as discussed in the examples of FIGS. 10H and 10I). In one example, the values of the status and control registers 1102 may indicate that the device 505 is ready for a next authentication task (e.g., Busy=0b). An authentication challenge may be prepared by the host 510 (e.g., using its authentication engine firmware) and may be passed in multiple parts (e.g., 1110) to the device 505 by writing each part (e.g., Parts 1-n) in sequence to the Write Mailbox register 965 of the device 505. As each part of the challenge message 1110 is sent to the device 505, the device 505 may copy the contents of written to the Write Mailbox 965 to its local memory before the next part of the challenge message 1110 is written by the host 510 to the Write Mailbox 965.

When all parts have been written to the device 505 through the Write Mailbox, the device may have a complete message 1115 stored in its memory. The host 510 may then write to the Go register (e.g., Go=1) (as shown at 1125) to indicate that a valid message has been delivered to the device 505 and instruct the device 505 to consume or process the message in accordance with an authentication scheme. When the device 505 begins consuming this message, the device 505 may set the Busy register (e.g., Busy=1b) (as shown at 1130) to indicate that the device is busy on corresponding tasks related to this message (e.g., 1115). Consumption of the challenge message 1115, in one example, may include the device 505 measuring its firmware and hardware circuitry and components of the device 505, generating a report, digest, or manifest including attributes of the device discovered by the device 505 during measurement activities (e.g., performed prior to or in response to a challenge message), generation of a signature, hash, or other cryptographic data, and other authentication data, among other example tasks. These tasks may be based on and defined on the particular authentication scheme utilized in the system to authenticate devices (e.g., 505) to the host 510. When the response data has been generated by the device 505, the device 505 can write to the Response Ready register (e.g., RR=1b) to indicate to the host 510 (i.e., upon the host's reading of the Response Ready register) that a response has been written by the device 505 to the Read Mailbox 970. In some implementations, in connection with the setting of Response Ready register, the device 505 may likewise write values to other status and control registers, such as by resetting the Go and Busy fields, among other register fields in connection with readying itself for receiving a next message from the host 510, among other examples.

Data generated by the device 505 (e.g., using an authentication engine, measurement engine, cryptographic engines, and other logic implemented in the firmware and/or hardware of the device 505) in response to the challenge message 1115, may be written to the Read Mailbox register 970 to be read and aggregated by the host 510. For instance, a response message may be written in parts (e.g., 1140), sequentially, to the read mailbox 970 by the device 505. As each part is written to the Read Mailbox 970, the host 510 may read the part and copy it to host memory (e.g., 810). When all of the parts 1140 of the response message have been written to the Read Mailbox by the device 505 and copied to host memory 810 by the host, the host 510 may have a copy of the entire message for consumption. As noted above, in some implementations, the response message 1145 may include authentication data prepared by the device 505 to authenticate its identity and capabilities to the host 510. For instance, the response message 1145 may include a manifest or digest describing attributes of the device 505 and may also, or alternatively, include a signature (e.g., generated using the device's private key), which the host 510 may use to determine the authenticity of the device 505, as well as the device's capabilities. The host may use the information in this response (or information obtained in multiple responses received in response to multiple host requests) to determine policies (e.g., privileges, security, access levels, etc.) to apply to the device 505. These policies may be applied (at 1150) to link communications 1155 (or even the establishing or training of a link) between the host 510 and device 505. For instance, access to certain services, capabilities, or resources (e.g., defined under PCIe or under the host itself) may be enabled or restricted depending on whether the host 510 is able to authenticate the device 505 based on one or more challenges and responses between the host 510 and device 505. As a specific example, access to PCIe ATS may be permitted, limited, or denied to the device 505 by the host 510 based on whether the device was able to successfully establish its trustworthiness through the authentication protocol used by the host 510 and device 505. In general, successful authentication provides assurance to host software about the device being genuine (e.g., not tampered with). A variety of policies and actions may be based on or dependent on successful authentication. For instance, a hypervisor may utilize a successful authentication of a device within data center environments to assign the device to a specific tenant (e.g., virtual machine), among a variety of other examples and use cases.

While the example of FIG. 11 shows messages including a challenge message and a response message to the challenge message, it should be appreciated that multiple response messages may be sent to a single challenge message, a single response message may be sent in response to multiple preceding challenge messages or other requests, and that requests and responses can be of potentially any length and contain potentially any suitable content. Indeed, any requests and responses, which are defined as messages within an authentication scheme (e.g., for passing directly between host and device over a link or interconnect), may instead be communicated using read and write mailboxes provided on a device. For instance, all request and responses defined within the USB Authentication Specification or another authentication protocol (e.g., challenge requests, certificate digest queries, certificate chain request, etc.) may be implemented for a PCIe device through the use of a read and write mailboxes implemented using PCIe extended capability registers, among other example implementations. Further, in some implementations (e.g., host authentication or mutual authentication), the device may utilize a read mailbox on the device to communicate challenges and requests from the device to the host, with the device's write mailbox used for delivering responses by the host to the device, among other example uses, flows, and example implementations.

Figure 12:
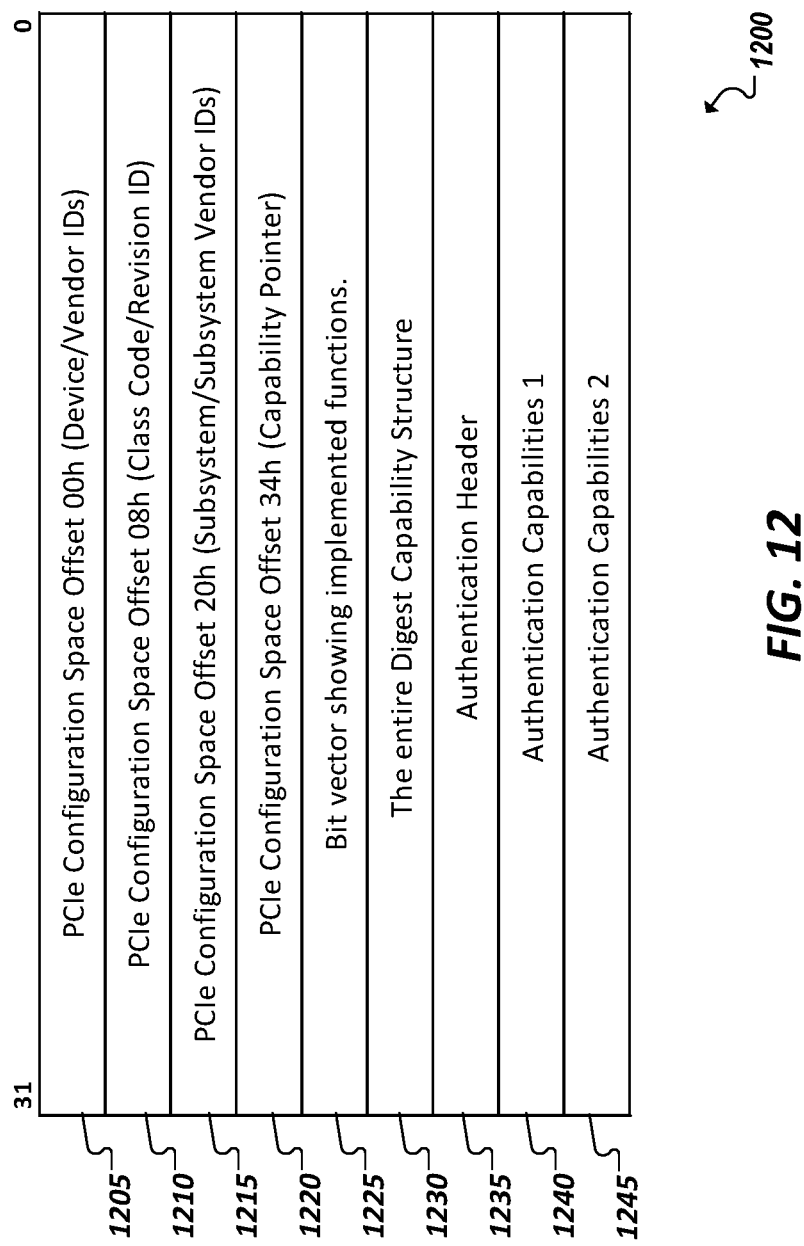
FIG. 12 is a diagram representing an example manifest to be generated in association with authentication of the device.

Turning to FIG. 12, a representation of an example manifest 1200 is shown, which may be signed or from which a hash may be generated by the device as authentication data in some example authentication schemes and written to a read mailbox register. For instance, an example manifest 1200 may be included in an authentication response message. In one example, a hash of the manifest 1200 (e.g., using an SHA hashing algorithm, such as SHA384) may be generated and included in one or more fields defined in an authentication response defined according to a particular protocol used in the authentication session. For instance, turning to FIG. 13, in an example USB Authentication scheme, in response to a challenge request, a challenge authentication response may be defined to be sent, the format of which is illustrated in FIG. 13. For instance, in the payload of the challenge authentication response, a context hash field 1305 may be provided. In one example, a hash (e.g., using SHA384) of a manifest generated by a PCIe device and including PCIe-specific information may be encoded within the context hash field 1305 in a challenge authentication response defined for USB, among other example implementations.

Returning to the example of FIG. 12, in some implementations, a digest may include a variety of fields (e.g., 1205-1245) providing PCIe-specific information concerning the device to be authenticated. For instance, fields (e.g., 1205, 1210, 1215) may be provided to include information from PCIe configuration space, such as the device and vendor identifiers for the device (and potentially the board upon which it resides), the class code and revision identifiers for the device, and subsystem and/or subsystem vendor identifiers for the device (and the board upon which it resides, if relevant), among other example information. A field 1220 may be further provided to indicate the capability pointer. Further, one or more fields (e.g., 1225) may be provided to indicate a bit vector serving as a bitmask to indicate the one or multiple functions implemented by the device. Further, one or more fields (e.g., 1230) may be provided to include measurements of the device, such as measurements incorporated in a digest. In one example, the device may maintain a digest register or digest capability structure. A device may implement one or more digest registers (e.g., a digest register for each one of one or more defined portions of its firmware) to contain measurements for corresponding firmware components and thereby expose cryptographic identifies of its respective firmware portions or components. In one example, a digest capability structure may identify information concerning the digest, its status and characteristics, which firmware components it corresponds to, together with the contents of the digest itself. In the example of FIG. 12, an entire digest capability structure may be included in the manifest. In other examples, only the digest itself may be included in the manifest, among other example implementations. In addition to information relating to the measurement of the device or the digest including such measurements, an example manifest data structure 1200 may additionally include one or more fields to include information concerning the device's implementation of the authentication architecture. For instance, information from one or more registers or register fields of the authentication extended capability structure (e.g., as discussed in the examples of any one of FIGS. 9-10M) may be included in the manifest. As an example, fields 1235, 1240, 1245 may be populated with information from an authentication header (e.g., such as in the example of FIG. 10D) and information from authentication capabilities fields (e.g., such as the authentication capability information shown and described in the examples of FIGS. 10E-10F), among other example information.

As noted above, responses to a challenge, such as provided by a device to a host during device authentication, may include data signed by the private key of the device. Turning against to the example response format shown in FIG. 13, a field (e.g., 1310) may be provided to include a signature generated using the private key of the device being authenticated. For instance, in one example implementations, the signature field may be encoded with a signature, generated by the device using its private key, of the entire contents of the response message (e.g., 1300) excluding the signature field 1310. In another example, the signature can be a signature on the contents of both the challenge request and the response message (excluding the signature field 1310), among other examples. In some implementations, the signature may be a deterministic or non-deterministic Elliptic Curve Digital Signature Algorithm (ECDSA) signature, Digital Signature Algorithm (DSA) signature, or other signature generated according to another digital signing algorithm using a private key of the device to be authenticated, among other examples. This signature can be used to allow the verifier to confirm the identity of the device. Indeed, calculating a hash value of a manifest data structure (e.g., as in FIG. 12) and providing a signature using the device private key allow the field values provided in the response (e.g., as in FIG. 13) to be verified as genuine according to the device vendor's specification, as opposed to blindly trusting the values reported by a device, among other example uses and advantages.

The foregoing disclosure has presented a number of example testing link states, which may supplement standard link states defined in an interconnect protocol. It should be appreciated that other testing link states may be provided in addition to those identified above without departing from the more generalized principles contained within this disclosure. For instance, while some of the example state machines and ordered sequences discussed herein were described with reference to PCIe or PCIe-based protocols, it should be appreciated that similar, corresponding enhancements may be made to other interconnect protocols, such OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centriq™ interconnect, among others.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures. For instance, a host and device may be implemented, which are equipped with functionality to implement authentication and measurement architectures as discussed in the examples above, in any one of a variety of computing architectures (e.g., using any one of a variety of different interconnects or fabrics). For instance, a host may connect to a device supporting the authentication architecture within a personal computing system (e.g., implemented in a laptop, desktop, mobile, smartphone, Internet of Things (IoT) device, smart appliance, gaming console, media console, etc.). In another example, a host may connect to a device supporting the authentication architecture within a server computing system (e.g., a rack server, blade server, tower server, rack scale server architecture or other disaggregated server architecture), among other examples.

Figure 14:
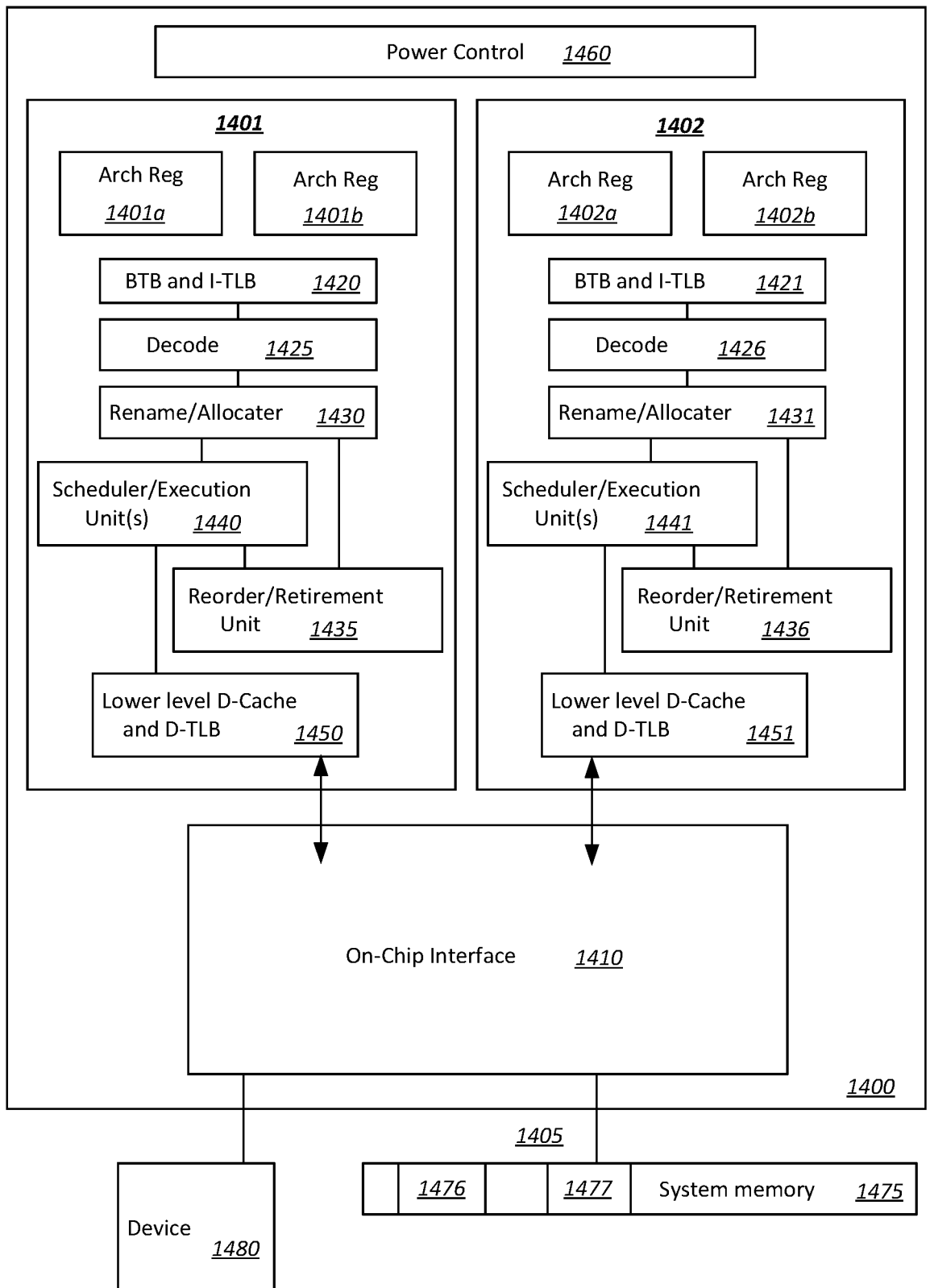
FIG. 14 illustrates an embodiment of a block diagram for a computing system including a multicore processor.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores-core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores-core 1401 and 1402. Here, core 1401 and 1402 are considered symmetric cores, i.e. cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401a and 1401b, which may also be referred to as hardware thread slots 1401a and 1401b. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401a, a second thread is associated with architecture state registers 1401b, a third thread may be associated with architecture state registers 1402a, and a fourth thread may be associated with architecture state registers 1402b. Here, each of the architecture state registers (1401a, 1401b, 1402a, and 1402b) may be referred to as processing elements, thread slots, or thread units, as described above. As illustrated, architecture state registers 1401a are replicated in architecture state registers 1401b, so individual architecture states/contexts are capable of being stored for logical processor 1401a and logical processor 1401b. In core 1401, other smaller resources, such as instruction pointers and renaming logic in allocator and renamer block 1430 may also be replicated for threads 1401a and 1401b. Some resources, such as re-order buffers in reorder/retirement unit 1435, ILTB 1420, load/store buffers, and queues may be shared through partitioning. Other resources, such as general purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401a, 1401b, respectively. Usually core 1401 is associated with a first ISA, which defines/specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401*a* and 1401*b* are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last—level data cache-last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (often including a memory controller hub to connect to memory 1475 and an I/O controller hub to connect peripheral devices), a memory controller hub, a northbridge, or other integrated circuit. And in this scenario, bus 1405 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1400. For example in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 15:
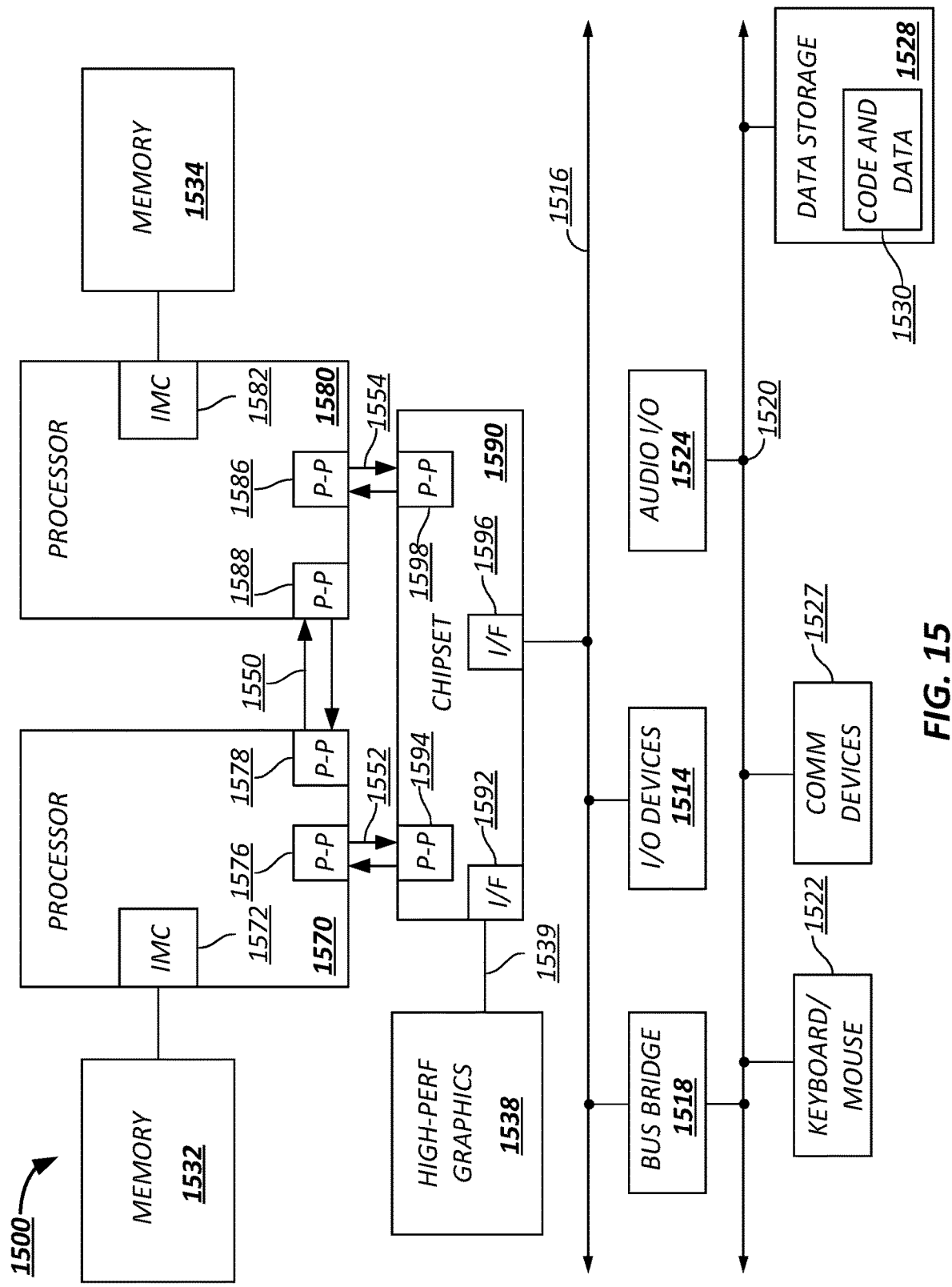
FIG. 15 illustrates an embodiment of a block for a computing system including multiple processors.

Referring now to FIG. 15, shown is a block diagram of another system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as a high-performance architecture. As a result, the invention may be implemented within the QPI architecture.

While shown with only two processors 1570, 1580, it is to be understood that the scope of the present invention is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1410 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In some embodiments, an electronic device may be configured to perform one or more processes, techniques, and/or methods as described herein, or portions thereof. One such process is depicted in Figure X-2. For example, the process may include performing, by a first and second retimer, an SKP adjustment during a first SKP ordered set (OS); and performing, by a third and fourth retimer, an SKP adjustment during a second SKP OS.

In some embodiments, an electronic device may be configured to perform one or more processes, techniques, and/or methods as described herein, or portions thereof. For example, the process may include enhancing a training ordered set (OS) to allow for five generations of speeds; and setting a configuration register to indicate a Gen 5 PCIe speed.

In some embodiments, an electronic device may be configured to perform one or more processes, techniques, and/or methods as described herein, or portions thereof. For example, the process may include identifying a channel type provided by a platform; identifying a presence of one or more retimers; and choosing, based on the channel type and whether one or more retimers are present, between 25 Gigatransfers per second (GT/s) and 32 GT/s.

In some embodiments, an electronic device may be configured to perform one or more processes, techniques, and/or methods as described herein, or portions thereof. For example, the process may include identifying a channel link width from a set that includes widths of ×20, ×24, ×28, and ×28; and communicating over a channel link based on the identified channel link width.

In some embodiments, an electronic device may be configured to perform one or more processes, techniques, and/or methods as described herein, or portions thereof. For example, the process may include identifying recovered clock data from clock data recovery (CDR); and transmitting, based on the recovered clock data, transmit (TX) data after an initial training.

In some embodiments, a method of communicating in accordance with a PCIe standard may be provided that includes performing, by a first and second retimer, an SKP adjustment during a first SKP ordered set (OS), and performing, by a third and fourth retimer, an SKP adjustment during a second SKP OS. The method can further include reducing a SKP OS frequency by half. In some cases, the first SKP OS may be sent back-to-back with the second SKP OS. The method may further include enhancing a training ordered set (OS) to allow for five generations of speeds, and setting a configuration register to indicate a Gen 5 PCIe speed. Further, a channel type provided by a platform may be identified, the presence of one or more retimers may be identified, and the channel speed may be selected (e.g., from either 25 Gigatransfers per second (GT/s) or 32 GT/s) based on the channel type and whether one or more retimers are present. This selection may also be determined based on whether forward error correction (FEC) is enabled or supported. This speed selection may take place during link training. These example methods may additional include identifying a channel link width from a set that includes widths of ×20, ×24, ×28, and ×28, and communicating over a channel link based on the identified channel link width. Further, recovered clock data from a clock data recovery component may be identified, and transmit data may be sent based on the recovered clock data following training of the link.

In some embodiments, an apparatus may be provided to communicate in accordance with a PCIe-based standard, the apparatus including an extended continuous time linear equalizer (CTLE), and/or minimum 8-tap decision feedback equalizer (DFE), and/or a T-coil or Pi-coil termination, and/or a data pattern filter related to clock data recovery (CDR), and/or a 4-way interleaved clock architecture, among other example features and components.

In some embodiments, an apparatus may be provided to communicate in accordance with a peripheral component interconnect express (PCIe) standard with channel loss characteristics, such as discussed above. The PCIe standard may be a Gen 5 (or higher) PCIe standard.

The following examples pertain to embodiments in accordance with this Specification. Example 1 is an apparatus including: a microcontroller; memory including secure memory to store a private key; a set of registers, where the set of registers includes one or more mailbox registers, and message data is to be written to at least one of the one or more mailbox registers by a host system, the message data includes at least a portion of a challenge request, and the challenge request includes a challenge by the host system to authenticity of the apparatus; and an authentication engine to: generate a response to the challenge, where the response includes data to identify attributes of the apparatus and a signature generated using the private key; and cause at least a portion of the response to be written to one of the one or more mailbox registers to be read by the host system.

Example 2 may include the subject matter of example 1, where the one or more registers include a write data mailbox and a read data mailbox, the host system is to write the message data to the write data mailbox, and the authentication engine is to write the response to the read data mailbox.

Example 3 may include the subject matter of example 2, where the write data mailbox and the read data mailbox include registers in an extended capability register structure further including one or more additional registers to indicate authentication features supported by the apparatus.

Example 4 may include the subject matter of any one of examples 1-3, where the apparatus includes a device compliant with a Peripheral Component Interconnect Express (PCIe)-based interconnect protocol.

Example 5 may include the subject matter of example 4, where the challenge is to authenticate the device to the host system, the challenge request is based on a Universal Serial Bus (USB)-based authentication protocol, and the response is based on the USB-based authentication protocol.

Example 6 may include the subject matter of any one of examples 1-5, further including microcontroller firmware, where the challenge to the authenticity of the apparatus includes a challenge to determine trustworthiness of the microcontroller firmware.

Example 7 may include the subject matter of example 6, where the authentication engine is implemented at least in part in the microcontroller firmware.

Example 8 may include the subject matter of any one of examples 1-6, where generation of the response includes generation of a manifest data structure including the data to identify attributes of the apparatus.

Example 9 may include the subject matter of example 8, where the response includes a hash of the manifest.

Example 10 may include the subject matter of any one of examples 8-9, where the manifest includes a measurement of firmware of the microcontroller.

Example 11 may include the subject matter of example 10, further including a measurement engine to securely perform the measurement of the firmware.

Example 12 may include the subject matter of any one of examples 1-11, where the challenge request includes a plurality of portions, the message data includes a first portion of the challenge request, the apparatus includes logic to copy the first portion of the challenge request to the memory, a second portion of the challenge request is received from the host system and written to the one or more mailbox registers after the first portion of the challenge request is copied to memory, and the authentication engine is to access the challenge request from memory after all of the plurality of portions of the challenge request have been written to the one or more mailbox registers and copied to the memory.

Example 13 may include the subject matter of example 12, where the set of registers includes a control register, and the control register includes at least one Go bit to be written to by the host system to indicate that the apparatus is to consume the challenge request.

Example 14 may include the subject matter of any one of examples 1-13, where the response includes a plurality of portions, the apparatus includes logic to write each of the plurality of portions in sequence to the one or more mailbox registers, and the host system reads each portion in the plurality of portions before a next portion in the plurality of portions is written to the one or more mailbox registers.

Example 15 may include the subject matter of example 14, where the set of registers includes a status register, and the status register includes at least one Response Ready bit to be read by the host system and indicate that the authentication engine has generated a response to the challenge request.

Example 16 may include the subject matter of any one of examples 1-15, further including interrupt logic to generate an interrupt to the host system to indicate that the response is ready to be read by the host system.

Example 17 is a method including: receiving a request to write at least a portion of a challenge request from a host system to a write mailbox register on a device connected to the host system, where the challenge request includes a challenge to authenticity of the device, and the device includes an authentication register structure to implement device authentication, the authentication register structure includes the write mailbox register and a read mailbox register; copying the challenge request from the write mailbox register to memory of the device; generating a response to the challenge request, where the response includes a hash of a manifest data structure and a signature, the manifest data structure indicates attributes of the device, and the signature is generated from a private key on the device; writing at least a portion of the response to the read mailbox register on the device; and receiving a read request from the host system to read the at least a portion of the response from the read mailbox register.

Example 18 may include the subject matter of example 17, where the device is compliant with a Peripheral Component Interconnect Express (PCIe)-based interconnect protocol.

Example 19 may include the subject matter of example 18, where the host system is to authenticate the device based on the response.

Example 20 may include the subject matter of example 19, where the response includes information regarding the firmware of the device, and the host system is to authenticate the device based on a determination that the firmware of the device is trustworthy.

Example 21 may include the subject matter of example 20, where at least a portion of the method is performed using the firmware of the device.

Example 22 may include the subject matter of any one of examples 17-21, where the challenge request is based on a Universal Serial Bus (USB)-based authentication protocol, and the response is based on the USB-based authentication protocol.

Example 23 may include the subject matter of any one of examples 17-22, where generating the response includes generating the manifest data structure.

Example 24 may include the subject matter of example 23, where the manifest data structure includes a measurement of firmware of the device.

Example 25 may include the subject matter of any one of examples 17-24, where the challenge request includes a plurality of portions, the request to write includes a plurality of writes to write each one of the plurality of portions in sequence to the write mailbox register, and the method further includes copying each one of the plurality of portions to local memory of the device prior to a next one of the plurality of portions being written to the write mailbox register.

Example 26 may include the subject matter of example 25, where the device includes a set of authentication registers including the write mailbox register, the read mailbox register, and a control register, and the control register includes at least one Go bit to be written to by the host system to indicate that the device is to consume the challenge request.

Example 27 may include the subject matter of any one of examples 17-26, where the response includes a plurality of portions, and writing at least a portion of the response to the read mailbox register includes writing each one of the plurality of portions to the read mailbox register in sequence.

Example 28 may include the subject matter of example 27, where the device includes a set of authentication registers including the write mailbox register, the read mailbox register, and a status register, and the status register includes at least one Response Ready bit to be read by the host system and indicate that the device has generated the response to the challenge request, where the method further includes writing to the Response Ready bit to indicate that the response is ready.

Example 29 may include the subject matter of any one of examples 17-28, further including generating an interrupt to the host system to indicate that the response is ready to be read by the host system from the read mailbox register.

Example 30 is a non-transitory machine accessible storage medium having instructions stored thereon, the instructions when executed on a machine, cause the machine to: identify a device connected to a host by an interconnect; generate a challenge for the device to test trustworthiness of the device; write the challenge to a write mailbox register of the device; identify that a response to the challenge has been generated and that at least a portion of the response is written to a read mailbox register of the device; read the at least a portion of the response; determine from the response whether the device is trusted; and apply one or more policies to the device.

Example 31 may include the subject matter of example 30 where the instructions when executed, further cause the machine to poll a status register on the device to determine whether the response is ready.

Example 32 may include the subject matter of any one of examples 30-31, where the instructions when executed, further cause the machine to write a value to a control register on the device to trigger consumption of the challenge by the device.

Example 33 may include the subject matter of any one of examples 30-32, where the device is compliant with a Peripheral Component Interconnect Express (PCIe)-based interconnect protocol.

Example 34 may include the subject matter of example 33, where the interconnect is compliant with the Peripheral Component Interconnect Express (PCIe)-based interconnect protocol.

Example 35 may include the subject matter of example 34, where the challenge is based on a Universal Serial Bus (USB)-based authentication specification, and the response is based on the USB-based authentication specification.

Example 36 may include the subject matter of any one of examples 30-35, where the response includes a signature generated from a private key of the device, and determining whether the device is trusted is based on authenticity of the signature.

Example 37 may include the subject matter of any one of examples 30-36, where the response includes a hash of a manifest generated by the device, where the manifest identifies attributes of the device.

Example 38 may include the subject matter of example 37, where the manifest includes a measurement of firmware of the device.

Example 39 may include the subject matter of any one of examples 30-38, where the challenge includes a plurality of portions, writing the challenges to the write mailbox register includes writing each one of the plurality of portions in sequence to the write mailbox register.

Example 40 may include the subject matter of any one of examples 30-39, where the response includes a plurality of portions, and reading the at least a portion of the response from the read mailbox register includes reading each one of the plurality of portions from the read mailbox register in sequence.

Example 41 is a system including: a host including a processor to execute host software; and a device connected to the host by an interconnect, where the device includes: a microcontroller; memory including secure memory to store a private key; a set of registers to implement an authentication capability structure, where the set of registers includes a write mailbox register, a read mailbox register, and an authentication capability register, the authentication capability register indicates authentication capabilities of the host, the write mailbox register is to store message data written by the host, the message data includes at least a portion of a challenge request, and the challenge request requests authentication data to affirm trustworthiness of the device; and an authentication engine to: generate a response to the challenge request, where the response includes the authentication data, and the authentication data is to identify attributes of firmware of the microcontroller and includes a signature generated using the private key; and cause at least a portion of the response to be written to the read mailbox register, where the read mailbox register is to be read by the host system.

Example 42 may include the subject matter of example 41, where the host is to write the challenge request to the write mailbox register and read the response from the read mailbox register, and the host is to determine one or more policies to apply to the device based on the response.

Example 43 may include the subject matter of any one of examples 41-42, where the authentication capability structure includes an extended capability structure compliant with a Peripheral Component Interconnect Express (PCIe)-based interconnect protocol.

Example 44 may include the subject matter of example 43, where the challenge request and response are based on a Universal Serial Bus (USB)-based authentication specification.

Example 45 may include the subject matter of any one of examples 43-44, where the device is compliant with the PCIe-based interconnect protocol.

Example 46 may include the subject matter of any one of examples 43-45, where the interconnect is compliant with the PCIe-based interconnect protocol.

Example 47 may include the subject matter of any one of examples 41-46, where the interconnect is compliant with an interconnect protocol based on one of a Gen-Z-, Ultra Path Interconnect (UPI)-, Cache Coherent Interconnect for Accelerators (CCIX)-, Advanced Micro Device Infinity-, Common Communication Interface (CCI)-, or Centriq-based interconnect protocol.

Example 48 may include the subject matter of any one of examples 41-47, where the host and device are components within a server architecture.

Example 49 may include the subject matter of example 48, where the server architecture includes a rack scale server architecture.

Example 50 may include the subject matter of any one of examples 41-47, further including a personal computing device including the host and the device.

Example 51 may include the subject matter of any one of examples 41-50, where the extended capability structure includes a Designated Vendor-Specific Extended Capability (DVSEC) structure.

Example 52 is a system including means to perform the method of any one of examples 17-29.

Example 53 may include the subject matter of example 52, where the means include microcontroller firmware of the device.

Example 54 may include the subject matter of example 52, where the means include a machine readable medium encoded with instructions executable by a data processing apparatus to perform at least a portion of the method of any one of examples 17-29.

Example 55 may include the subject matter of example 52, where the means include hardware circuitry.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a microcontroller;
memory comprising secure memory to store a private key;
a set of Peripheral Component Interconnect Express (PCIe)-based capability registers, wherein the set of PCIe-based capability registers comprises one or more mailbox registers, and message data is to be written to at least one of the one or more mailbox registers by a host system, the message data comprises at least a portion of a challenge request, and the challenge request comprises a challenge by the host system to authenticity of the apparatus; and
an authentication engine to:
generate a response to the challenge, wherein the response comprises data to identify attributes of the apparatus and a signature generated using the private key; and
cause at least a portion of the response to be written to one of the one or more mailbox registers to be read by the host system, wherein the challenge request is based on a Universal Serial Bus (USB)-based authentication protocol, and the response is based on the USB-based authentication protocol.

2. The apparatus of claim 1, wherein the one or more registers comprise a write data mailbox and a read data mailbox, the host system is to write the message data to the write data mailbox, and the authentication engine is to write the response to the read data mailbox.

3. The apparatus of claim 2, wherein the write data mailbox and the read data mailbox comprise registers in an extended capability register structure further comprising one or more additional registers to indicate authentication features supported by the apparatus.

4. The apparatus of claim 1, wherein the apparatus comprises a device compliant with a Peripheral Component Interconnect Express (PCIe)-based interconnect protocol.

5. The apparatus of claim 4, wherein the challenge is to authenticate the device to the host system.

6. The apparatus of claim 1, further comprising microcontroller firmware, wherein the challenge to the authenticity of the apparatus comprises a challenge to determine trustworthiness of the microcontroller firmware.

7. The apparatus of claim 6, wherein the authentication engine is implemented at least in part in the microcontroller firmware.

8. The apparatus of claim 1, wherein generation of the response comprises generation of a manifest data structure comprising the data to identify attributes of the apparatus.

9. The apparatus of claim 8, wherein the response comprises a hash of the manifest.

10. The apparatus of claim 8, wherein the manifest comprises a measurement of firmware of the microcontroller.

11. The apparatus of claim 10, further comprising a measurement engine to securely perform the measurement of the firmware.

12. The apparatus of claim 1, wherein the challenge request comprises a plurality of portions, the message data comprises a first portion of the challenge request, the apparatus comprises logic to copy the first portion of the challenge request to the memory, a second portion of the challenge request is received from the host system and written to the one or more mailbox registers after the first portion of the challenge request is copied to memory, and the authentication engine is to access the challenge request from memory after all of the plurality of portions of the challenge request have been written to the one or more mailbox registers and copied to the memory.

13. The apparatus of claim 12, wherein the set of registers comprises a control register, and the control register comprises at least one Go bit to be written to by the host system to indicate that the apparatus is to consume the challenge request.

14. The apparatus of claim 1, wherein the response comprises a plurality of portions, the apparatus comprises logic to write each of the plurality of portions in sequence to the one or more mailbox registers, and the host system reads each portion in the plurality of portions before a next portion in the plurality of portions is written to the one or more mailbox registers.

15. The apparatus of claim 14, wherein the set of registers comprises a status register, and the status register comprises at least one Response Ready bit to be read by the host system and indicate that the authentication engine has generated a response to the challenge request.

16. The apparatus of claim 1, further comprising interrupt logic to generate an interrupt to the host system to indicate that the response is ready to be read by the host system.

17. A method comprising:
receiving a request to write at least a portion of a challenge request from a host system to a write mailbox register on a device connected to the host system, wherein the challenge request comprises a challenge to authenticity of the device, and the device comprises a set of Peripheral Component Interconnect Express (PCIe)-based capability registers to implement device authentication, wherein the set of PCIe-based capability registers comprises the write mailbox register and a read mailbox register, and the challenge request is based on a Universal Serial Bus (USB)-based authentication protocol;
copying the challenge request from the write mailbox register to memory of the device;
generating a response to the challenge request, wherein the response comprises a hash of a manifest data structure and a signature, the manifest data structure indicates attributes of the device, the signature is generated from a private key on the device, and the response is based on the USB-based authentication protocol;
writing at least a portion of the response to the read mailbox register on the device; and
receiving a read request from the host system to read the at least a portion of the response from the read mailbox register.

18. At least one non-transitory machine accessible storage medium having instructions stored thereon, the instructions when executed on a machine, cause the machine to:
identify a device connected to a host by an interconnect compliant with a Peripheral Component Interconnect Express (PCIe)-based protocol;
generate a challenge for the device to test trustworthiness of the device;
write the challenge to a write mailbox register of the device, wherein the write mailbox register comprises a first PCIe extended capability register;
identify that a response to the challenge has been generated and that at least a portion of the response is written to a read mailbox register of the device, wherein the read mailbox register comprises a second PCIe extended capability register;
read the at least a portion of the response;
determine from the response whether the device is trusted; and
apply one or more policies to the device.

19. The storage medium of claim 18, wherein the instructions when executed, further cause the machine to:
poll a status register on the device to determine whether the response is ready.

20. The storage medium of claim 18, wherein the instructions when executed, further cause the machine to:
write a value to a control register on the device to trigger consumption of the challenge by the device.

21. A system comprising:
a host comprising a processor to execute host software; and
a device connected to the host by an interconnect, wherein the device comprises:
a microcontroller;
memory comprising secure memory to store a private key;
a set of Peripheral Component Interconnect Express (PCIe)-based capability registers, wherein the set of PCIe-based capability registers comprises a write mailbox register, a read mailbox register, and an authentication capability register, the authentication capability register indicates authentication capabilities of the host, the write mailbox register is to store message data written by the host, the message data comprises at least a portion of a challenge request, and the challenge request requests authentication data to affirm trustworthiness of the device; and
an authentication engine to:
generate a response to the challenge request, wherein the response comprises the authentication data, and the authentication data is to identify attributes of firmware of the microcontroller and comprises a signature generated using the private key; and
cause at least a portion of the response to be written to the read mailbox register, wherein the read mailbox register is to be read by the host system, wherein the challenge request is based on a Universal Serial Bus (USB)-based authentication protocol, and the response is based on the USB-based authentication protocol.

22. The system of claim 21, wherein the host is to write the challenge request to the write mailbox register and read the response from the read mailbox register, and the host is to determine one or more policies to apply to the device based on the response.

23. The system of claim 21, wherein the set of PCIe-based capability registers comprises a set of extended capability registers.

24. The system of claim 21, wherein at least one of the set of extended capability registers comprises a Designated Vendor-Specific Extended Capability (DVSEC) structure.

\* \* \* \* \*